US012732267B2

(12) United States Patent
Cui

(10) Patent No.: US 12,732,267 B2
(45) Date of Patent: Sep. 8, 2026

(54) METHOD AND DEVICE OF BACK SCATTERING COMMUNICATION

(71) Applicant: GUANGDONG OPPO MOBILE TELECOMMUNICATIONS CORP., LTD., Dongguan (CN)

(72) Inventor: Shengjiang Cui, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 18/799,377

(22) Filed: Aug. 9, 2024

(65) Prior Publication Data

US 2024/0405863 A1 Dec. 5, 2024

Related U.S. Application Data

(63) Continuation of application No. PCT/CN2022/076104, filed on Feb. 11, 2022.

(51) Int. Cl.
*H04B 7/22* (2006.01)
*H02J 50/00* (2016.01)
*H04W 72/0446* (2023.01)

(52) U.S. Cl.
CPC .............. *H04B 7/22* (2013.01); *H02J 50/001* (2020.01); *H04W 72/0446* (2013.01)

(58) Field of Classification Search
CPC .... H04B 7/22; H04W 72/0446; H04W 72/00; H02J 50/20; H02J 50/001
See application file for complete search history.

(56) References Cited

U.S. PATENT DOCUMENTS

| | | | | |
|---|---|---|---|---|
| 2005/0247779 | A1 | 11/2005 | Ohkubo et al. | |
| 2014/0003369 | A1 | 1/2014 | Josiam et al. | |
| 2020/0226333 | A1 | 7/2020 | Riggert | |
| 2020/0374164 | A1 | 11/2020 | Baldemair et al. | |
| 2022/0390393 | A1 | 12/2022 | Yan et al. | |
| 2024/0146408 | A1* | 5/2024 | Herath | H04J 11/00 |
| 2025/0016822 | A1* | 1/2025 | Elkotby | H04W 74/004 |
| 2025/0192879 | A1* | 6/2025 | Yang | G06K 7/10346 |

(Continued)

FOREIGN PATENT DOCUMENTS

| | | |
|---|---|---|
| CN | 109511132 A | 3/2019 |
| CN | 109547183 A | 3/2019 |

(Continued)

OTHER PUBLICATIONS

International Search Report and Written Opinion of the International Searching Authority for International Application No. PCT/CN2022/076104 mailed on Aug. 30, 2022.

(Continued)

*Primary Examiner* — Dac V Ha
(74) *Attorney, Agent, or Firm* — Sheppard, Mullin, Richter & Hampton LLP

(57) ABSTRACT

A method of back scattering communication includes: determining by a first communication device, time domain resource information for the back scattering communication according to first information; where the first information is identification information of the first communication device, or the first information is identification information of the first communication device and identification information of a serving cell.

20 Claims, 8 Drawing Sheets

(56) References Cited

U.S. PATENT DOCUMENTS

| | | | | |
|---|---|---|---|---|
| 2025/0261170 | A1* | 8/2025 | Elshafie | H02J 50/80 |
| 2025/0324442 | A1* | 10/2025 | Liu | H04W 72/0446 |

FOREIGN PATENT DOCUMENTS

| | | | |
|---|---|---|---|
| CN | 113207174 | A | 8/2021 |
| CN | 114124705 | A | 3/2022 |
| WO | 2004010633 | A1 | 1/2004 |
| WO | 2020236665 | A | 11/2020 |
| WO | 2021169586 | A | 9/2021 |

OTHER PUBLICATIONS

"EPC™ Radio-Frequency Identity Protocols Generation-2 UHF RFID Standard", Specification for RFID Air Interface Protocol for Communications at 860 MHz-960 MHz, Release 2.1, Ratified, Jul. 2018.

Extended European search report issued by the EPO for Application No. EP22925407.3 dated Nov. 3, 2025.

Office Action issued by the European Patent Office for Application No. 22925407.3 mailed on Jun. 15, 2026.

* cited by examiner

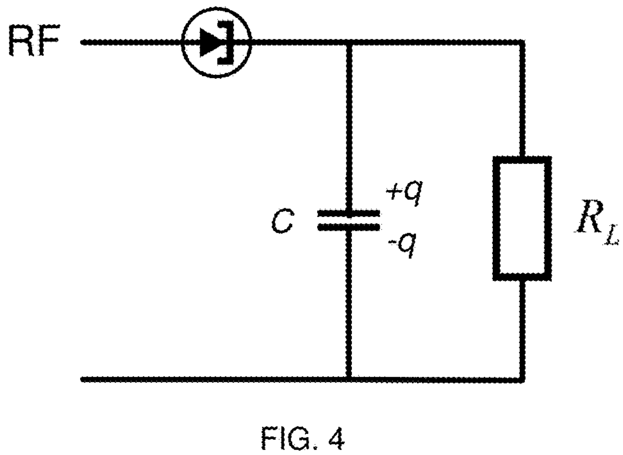

FIG. 4

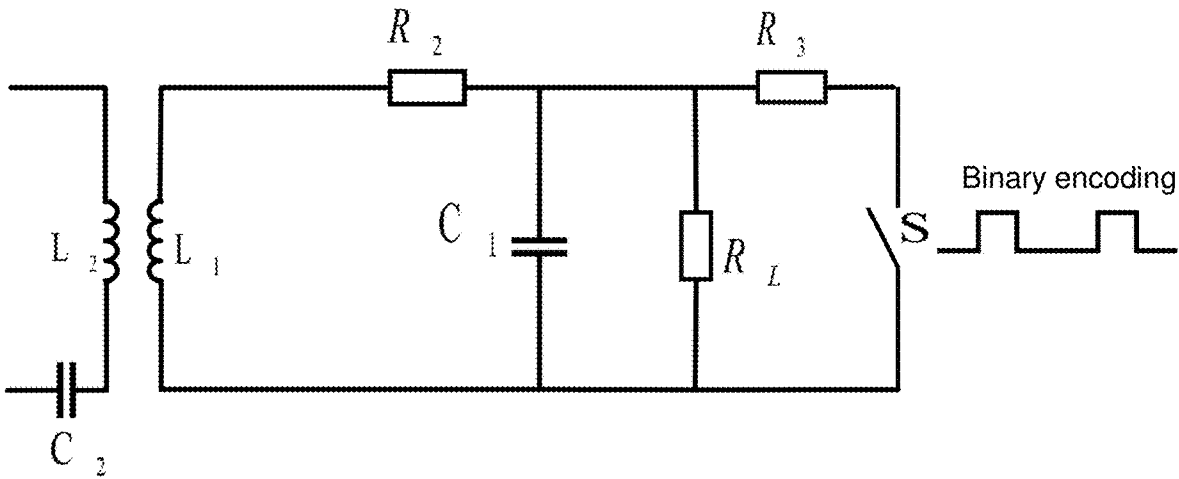

Determining by a first communication device, time domain resource information for back scattering communication according to first information; where the first information is identification information of the first communication device, or the first information is identification information of the first communication device and identification information of a serving cell

METHOD AND DEVICE OF BACK SCATTERING COMMUNICATION

CROSS-REFERENCE TO RELATED APPLICATION

This application is a Continuation Application of International Application No. PCT/CN2022/076104 filed on Feb. 11, 2022, which is incorporated herein by reference in its entirety.

TECHNICAL FIELD

Embodiments of the present application relate to the field of communication, and in particular, to a method and a device of back scattering communication.

BACKGROUND

In zero-power consumption communication, a zero-power consumption terminal may drive itself to work only after harvesting a radio wave to obtain energy. For scenarios such as logistics warehousing management and supermarket shopping, etc., a large number of zero-power consumption terminals need to be accessed, and how to avoid a conflict between different zero-power consumption terminals during back scattering communication is a problem that needs to be solved urgently.

SUMMARY

A method and a device of back scattering communication are provided by the embodiments of the present application.

In a first aspect, a method of back scattering communication is provided, and the method includes:

- determining by a first communication device, time domain resource information for the back scattering communication according to first information;
- where the first information is identification information of the first communication device, or the first information is identification information of the first communication device and identification information of a serving cell.

In a second aspect, a method of back scattering communication is provided, and the method includes:

- transmitting by a second communication device, a first scheduling signal, where the first scheduling signal is used to schedule or trigger the back scattering communication;
- receiving by the second communication device, a back scattering signal transmitted by a first communication device; where the back scattering signal is transmitted by the first communication device based on time domain resource information for the back scattering communication, the time domain resource information for the back scattering communication is determined by the first communication device based on first information, the first information is identification information of the first communication device, or the first information is identification information of the first communication device and identification information of a serving cell.

In a third aspect, a communication device is provided for performing the method in the above first aspect.

In some embodiments, the communication device includes functional modules for performing the method in the above first aspect.

In a fourth aspect, a communication device is provided for performing the method in the above second aspect.

In some embodiments, the communication device includes functional modules for performing the method in the above second aspect.

In a fifth aspect, a communication device is provided, including a processor and a memory; the memory is configured to store a computer program, and the processor is configured to invoke and execute the computer program stored in the memory, to cause the communication device to perform the method in the above first aspect.

In a sixth aspect, a communication device is provided, including a processor and a memory; the memory is configured to store a computer program, and the processor is configured to invoke and execute the computer program stored in the memory, to cause the communication device to perform the method in the above second aspect.

In a seventh aspect, an apparatus is provided for implementing the method of any one of the above first aspect to the above second aspect.

In some embodiments, the apparatus includes: a processor, configured to invoke and execute a computer program from a memory, to cause a device equipped with the apparatus to perform the method of any one of the above first aspect to the above second aspect.

In an eighth aspect, a non-transitory computer readable storage medium is provided, for storing a computer program, and the computer program causes a computer to perform the method of any one of the above first aspect to the above second aspect.

In a ninth aspect, a computer program product is provided, including a computer program instruction, and the computer program instruction causes a computer to perform the method of any one of the above first aspect to the above second aspect.

In a tenth aspect, a computer program is provided, and the computer program, when being executed on a computer, causes the computer to perform the method of any one of the above first aspect to the second aspect.

BRIEF DESCRIPTION OF THE DRAWINGS

FIG. 4 is a schematic diagram of energy harvesting, provided by the present application.

FIG. 5 is a circuit schematic diagram of resistive load modulation, provided by the present application.

FIG. 6 is a schematic flow chart of a method of back scattering communication, provided according to the embodiments of the present application.

DETAILED DESCRIPTION

Figure 1:
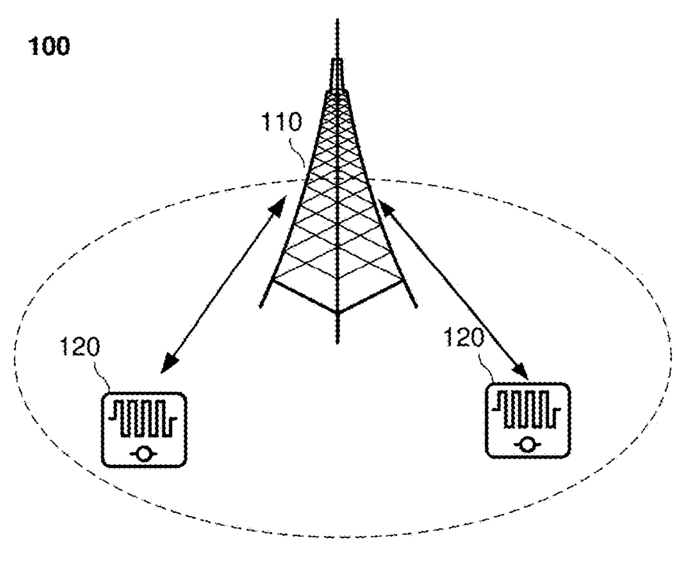
FIG. 1 is a schematic diagram of a communication system architecture, applied by the embodiments of the present application.

The technical solutions in the embodiments of the present application will be described in conjunction with the drawings in the embodiments of the present application, and apparently, the described embodiments are a part of the embodiments of the present application, but not all of the embodiments. For the embodiments of the present application, all other embodiments obtained by the ordinary skilled in the art belong to the protection scope of the present application.

The technical solutions of the embodiments of the present application may be applied to various communication systems, such as: a Global System of Mobile communication (GSM) system, a Code Division Multiple Access (CDMA) system, a Wideband Code Division Multiple Access (WCDMA) system, a General Packet Radio Service (GPRS), a Long Term Evolution (LTE) system, an Advanced long term evolution (LTE-A) system, a New Radio (NR) system, an evolution system of an NR system, an LTE-based access to unlicensed spectrum (LTE-U) system, an NR-based access to unlicensed spectrum (NR-U) system, a Non-Terrestrial communication Network (Non-Terrestrial Networks, NTN) system, a Universal Mobile Telecommunication System (UMTS), a Wireless Local Area Network (WLAN), an internet of things (IoT), a Wireless Fidelity (WiFi), a fifth-generation communication (5th-Generation, 5G) system, or other communication systems, etc.

Generally speaking, a number of connections supported by a traditional communication system is limited and is easy to implement, however, with the development of the communication technology, the mobile communication system will not only support the traditional communication, but also support, for example, Device to Device (D2D) communication, Machine to Machine (M2M) communication, Machine Type Communication (MTC), Vehicle to Vehicle (V2V) communication, or Vehicle to everything (V2X) communication, etc., and the embodiments of the present application may also be applied to these communication systems.

In some embodiments, the communication system in the embodiments of the present application may be applied to a carrier aggregation (CA) scenario, may also be applied to a dual connectivity (DC) scenario, and may also be applied to a standalone (SA) network deployment scenario, or applied to non-standalone (NSA) network deployment scenario.

In some embodiments, the communication system in the embodiments of the present application may be applied to an unlicensed spectrum, where the unlicensed spectrum may also be considered as a shared spectrum; or the communication system in the embodiments of the present application may also be applied to a licensed spectrum, where the licensed spectrum may also be considered as an unshared spectrum.

In some embodiments, the communication system in the embodiments of the present application may be applied to an FR1 frequency band (corresponding to a frequency band range of 410 MHz to 7.125 GHZ), or may also be applied to an FR2 frequency band (corresponding to a frequency band range of 24.25 GHz to 52.6 GHZ), or may also be applied to a new frequency band, such as a high frequency band corresponding to a frequency band range of 52.6 GHz to 71 GHz or corresponding to a frequency band range of 71 GHz to 114.25 GHz.

The embodiments of the present application describe various embodiments in conjunction with a network device and a terminal device, where the terminal device may also be referred to as a user equipment (UE), an access terminal, a user unit, a user station, a mobile station, a mobile platform, a remote station, a remote terminal, a mobile device, a user terminal, a terminal, a wireless communication device, a user agent or a user apparatus, etc.

The terminal device may be a station (STATION, STA) in the WLAN, may be a cellular phone, a cordless phone, a Session Initiation Protocol (SIP) phone, a Wireless Local Loop (WLL) station, or a personal digital assistant (PDA) device, a handheld device with a wireless communication function, a computing device or other processing devices connected to a wireless modem, a vehicle-mounted device, a wearable device, a terminal device in a next generation communication system such as in an NR network, or a terminal device in a Public Land Mobile Network (PLMN) network evolved in the future, etc.

In the embodiments of the present application, the terminal device may be deployed on land, which includes indoor or outdoor, in handheld, worn or vehicle-mounted; may also be deployed on water (e.g., on a ship, etc.); may also be deployed in the air (e.g., on an airplane, a balloon, a satellite, etc.).

In the embodiments of the present application, the terminal device may be a mobile phone, a pad, a computer with a wireless transceiving function, a Virtual Reality (VR) terminal device, an Augmented Reality (AR) terminal device, a wireless terminal device in industrial control, a wireless terminal device in self-driving, a wireless terminal device in remote medical, a wireless terminal device in smart grid, a wireless terminal device in transportation safety, a wireless terminal device in smart city, a wireless terminal device in smart home, a vehicle-mounted communication device, a wireless communication chip/application specific integrated circuit (ASIC)/system on chip (SoC), etc.

As an example but not a limitation, in the embodiments of the present application, the terminal device may also be a wearable device. The wearable device, which is also referred to as a wearable smart device, is a generic term for a device that can be worn, into which the daily wear is intelligently designed and developed by applying wearable technologies, such as glasses, gloves, watches, clothing, and shoes, etc. The wearable device is a portable device that is worn directly on the body, or integrated into the user's clothing or accessories. The wearable device is not just a hardware device, but also achieves powerful functions through software supporting, data interaction, and cloud interaction. A generalized wearable smart device includes for example, a smartwatch or smart glasses, etc., with full functions, large size, and entire or partial functions without relying on a smartphone, as well as, for example, a smart bracelet and smart jewelry for physical sign monitoring, which only focuses on a certain type of application function and needs to be used in conjunction with other devices such as a smartphone.

In the embodiments of the application, the network device may be a device used for communicating with a mobile device. The network device may be an Access Point (AP) in the WLAN, a base station (Base Transceiver Station, BTS) in the GSM or CDMA, may also be a base station (NodeB, NB) in the WCDMA, or may also be an evolutionary base station (Evolutionary Node B, eNB or eNodeB) in the LTE, or a relay station or an access point, or a vehicle-mounted device, a wearable device, and a network device or a base station (gNB) in an NR network, or a network device in the PLMN network evolved in the future or a network device in the NTN network, etc.

As an example but not a limitation, in the embodiments of the present application, the network device may have a mobile characteristic, for example, the network device may be a mobile device. In some embodiments, the network device may be a satellite or a balloon station. For example, the satellite may be a low earth orbit (LEO) satellite, a medium earth orbit (MEO) satellite, a geostationary earth orbit (GEO) satellite, a high elliptical orbit (HEO) satellite, etc. In some embodiments, the network device may also be a base station provided on land, water, and other places.

In the embodiments of the present application, the network device may provide a service for a cell, and the terminal device communicates with the network device through a transmission resource (such as a frequency domain resource, or a frequency spectrum resource) used by the cell. The cell may be a cell corresponding to the network device (such as the base station), the cell may belong to a macro base station or may also belong to a base station corresponding to a small cell, and the small cell here may include: a metro cell, a micro cell, a pico cell, a femto cell, etc., these small cells have characteristics of small coverage range and low transmission power, which are applicable for providing a data transmission service with high speed.

Exemplarily, the communication system 100 applied by the embodiments of the present application is shown in FIG. 1. The communication system 100 may include a network device 110, and the network device 110 may be a device that communicates with a terminal device 120 (also referred to as a communication terminal or a terminal). The network device 110 may provide communication coverage for a specific geographical area and may communicate with a terminal device located within the coverage area.

FIG. 1 exemplarily shows one network device and two terminal devices, and in some embodiments, the communication system 100 may include a plurality of network devices and may include another number of terminal devices within a coverage range of each network device, the embodiments of the present application are not limited thereto.

In some embodiments, the communication system 100 may also include other network entities such as a network controller and a mobility management entity, etc., which are not limited to the embodiments of the present application.

It should be understood that, in the embodiments of the present application, a device with a communication function in the network/system may be referred to as a communication device. Taking the communication system 100 shown in FIG. 1 as an example, the communication device may include the network device 110 and the terminal device 120 with the communication function, and the network device 110 and the terminal device 120 may be the exemplary devices described above, which will not be repeated herein; the communication device may also include other devices in the communication system 100, such as a network controller, a mobility management entity, and other network entities, which are not limited in the embodiments of the present application.

It should be understood that the terms herein "system" and "network" are often used interchangeably herein. The term herein "and/or" is only an association relationship to describe associated objects, meaning that there may be three kinds of relationships, for example, A and/or B may mean three cases where: A exists alone, both A and B exist, and B exists alone. In addition, a character "/" herein generally means that related objects before and after "/" are in an "or" relationship.

It should be understood that the present document relates to a first communication device and a second communication device, and the first communication device may be a terminal device, such as a mobile phone, a machine facility, a customer premise equipment (CPE), an industrial device, a vehicle, etc.; the second communication device may be a counterpart communication device of the first communication device, such as a network device, a mobile phone, an industrial device, a vehicle, an RFID tag, a zero-power consumption tag, etc. The first communication device as a terminal device and the second communication device as a network device, are taken as an exemplary instance herein.

The terms used in the implementation parts of the present application are only used to explain the embodiments of the present application and are not intended to limit the present application. The terms "first", "second", "third" and "fourth" etc., in the description, claims and drawings of the present application are used to distinguish different objects rather than to describe a specific order. In addition, the terms "including" and "having" and any derivations thereof are intended to cover non-exclusive inclusion.

It should be understood that the "indication" mentioned in the embodiments of the present application may be a direct indication, may also be an indirect indication, or may also represent having an association relationship. For example, A indicates B, which may mean that A directly indicates B, for example, B may be acquired by A; may also mean that A indirectly indicates B, for example, A indicates C, and B may be acquired by C; or may also mean that there is an association relationship between A and B.

In the description of the embodiments of the present application, the term "correspondence" may mean that there is a direct correspondence or indirect correspondence between the two, it may also mean that there is an associated relationship between the two, or it may also mean a relationship of indicating and being indicated or a relationship of configuring and being configured, etc.

In the embodiments of the present application, "predefined" or "preconfigured" may be implemented by pre-saving corresponding codes, tables or other manners that may be used for indicating related information, in the device (for example, including the terminal device and the network device), and the present application does not limit its specific implementation. For example, the predefined may refer to what is defined in a protocol.

In the embodiments of the present application, the "protocol" may refer to a standard protocol in the field of communication, which may include, for example, an LTE protocol, an NR protocol, and related protocols applied in the future communication system, and the present application is not limited thereto.

In order to facilitate the understanding of technical solutions of the embodiments of the present application, the technical solutions of the present application are described in detail below through exemplary embodiments. The following related technologies, as optional solutions, may be randomly combined with the technical solutions of the embodiments of the present application, which all belong to the protection scope of the embodiments of the present application. The embodiments of the present application include at least some of the following contents.

In recent years, the application of zero-power consumption devices has become more and more widespread. A typical zero-power consumption device is a radio frequency identification (Radio Frequency Identification, RFID), which is a technology for implementing an automatic transmission and identification of contactless tag information by means of spatial coupling of wireless radio frequency signals. The RFID tag is also referred to as a "radio frequency tag" or "electronic tag". Types of electronic tags, which are divided according to different power supply methods, may be divided into an active electronic tag, a passive electronic tag and a semi-passive electronic tag. The active electronic tag, also referred to as an active-type electronic tag, refers to energy for operations of the electronic label is provided by a battery, and the active electronic tag is formed by the battery, a memory and an antenna together, which is different from a activating method of passive radio frequency, it transmits information over a set frequency band until the battery is replaced. The passive electronic tag, referred to as a passive-type electronic tag, does not support an internal battery, and when the passive electronic tag is close to a reader/writer, the tag is within a near field range formed by antenna radiation of the reader/writer, and the electronic tag antenna generates an induced current by electromagnetic induction, and the induced current drives a chip circuit of the electronic tag. The chip circuit transmits identification information stored in the tag to the reader/writer by the electronic tag antenna. The semi-active electronic tag inherits advantages of the passive electronic tag with a small size, light weight, cheap price and long service life, and the internal battery supplies power only for very few circuits within the chip when not accessed by the reader/writer, and only when accessed by the reader/writer, the internal battery supplies power to the RFID chip, to increase the reading and writing distance of the tag to be farther, and improve the reliability of communication.

Figure 2:
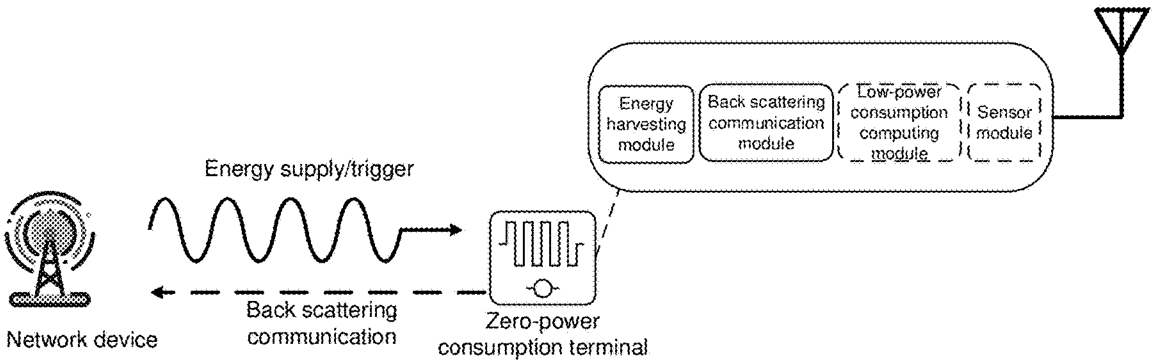
FIG. 2 is a schematic diagram of zero-power consumption communication, provided by the present application.

The RFID is a wireless communication technology. The most basic RFID system is formed by two parts: an electronic tag (TAG) and a reader/writer (Reader/Writer). The electronic tag: is formed by a coupling component and a chip. Each electronic tag possesses a unique electronic code and is placed on a measured target to achieve a purpose of marking a target object. The reader/writer: it can not only read information on the electronic tag, but also write the information on the electronic tag, and at the same time, provide the electronic tag with energy required for communication. As shown in FIG. 2, the electronic tag, after entering an electromagnetic field, receives a radio frequency signal transmitted by the reader/writer. The passive electronic tag or the passive-type electronic tag obtains energy by using the electromagnetic field generated in space, and transmits the information stored in the electronic tag, and then the reader/writer reads and decodes the information, thereby identifying the electronic tag.

Key technologies of the zero-power consumption communication include energy harvesting, back scattering communication as well as low-power consumption computing. As shown in FIG. 2, a typical zero-power consumption communication system includes a reader/writer and a zero-power consumption terminal. The reader/writer transmits radio waves to provide energy to the zero-power consumption terminal. An energy harvesting module installed in the zero-power consumption terminal may harvest energy carried by radio waves in space (radio waves transmitted by the reader/writer shown in FIG. 2), to drive a low-power consumption computing module of the zero-power consumption terminal and implement the back scattering communication. The zero-power consumption terminal, after obtaining energy, may receive a control command from the reader/writer and transmit data to the reader/writer based on the back scattering method, based on the control signaling. The transmitted data may come from data stored in the zero-power consumption terminal itself (for example, an identity or pre-written information, such as a production date, a brand, a manufacturer of the product, etc.). The zero-power consumption terminal may also be loaded with various sensors, so as to report data collected by the various sensors based on a zero-power consumption mechanism.

In order to facilitate a better understanding of the embodiments of the present application, the back scattering communication (Back Scattering) related to the present application is explained.

Figure 3:
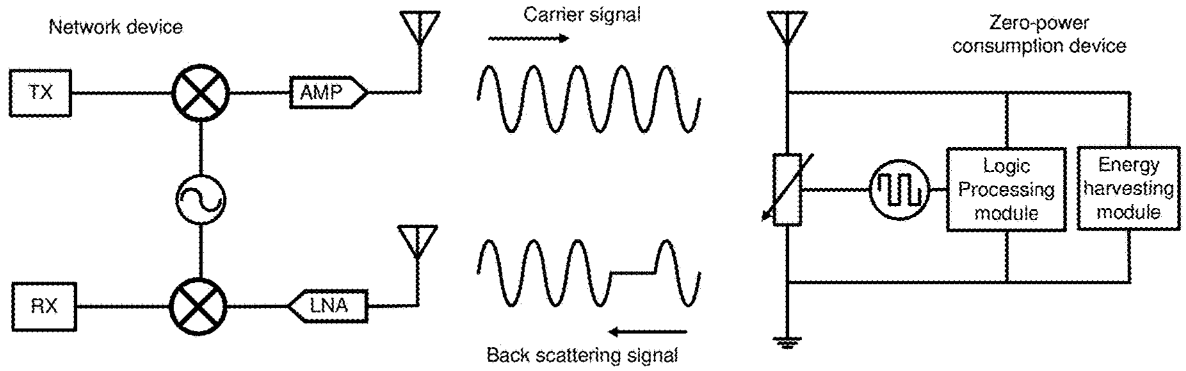
FIG. 3 is a schematic diagram of back scattering communication, provided by the present application.

As shown in FIG. 3, a zero-power consumption device (a back scattering tag in FIG. 3) receives a carrier signal transmitted by a back scattering reader/writer and harvests energy by a wireless radio frequency (RF) energy harvesting module. Then, it functions on a low-power consumption processing module (a logic processing module in FIG. 3), to modulate an incoming wave signal and perform back scattering.

Main features of the back scattering communication are as follows:

(1) the terminal does not actively transmit a signal, but implements the back scattering communication by modulating the incoming wave signal;

(2) the terminal does not rely on a traditional active power amplifier transmitter and at the same time, uses a low-power consumption computing unit, which greatly reduces hardware complexity;

(3) in conjunction with energy harvesting, battery-free communication is implemented.

In order to facilitate a better understanding of the embodiments of the present application, RF energy harvesting (Power Harvesting) related to the present application is explained.

As shown in FIG. 4, harvesting of electromagnetic wave energy in space is implemented by electromagnetic induction by using an RF module, and then driving of a load circuit (the low-power consumption computing, the sensor, etc.) is implemented, which enables battery-free.

In order to facilitate a better understanding of the embodiments of the present application, load modulation related to the present application is explained.

The load modulation is a method often used by the electronic tag to transmit data to the reader/writer. The load modulation changes the magnitude and phase of the impedance of the electronic tag, by adjusting an electrical parameter of an oscillation circuit of the electronic tag according to a rhythm of a data stream, thereby completing the modulation procedure. The load modulation technology mainly has two methods: resistive load modulation and capacitive load modulation. In the resistive load modulation, the load is connected in parallel with a resistor, referred to as a load modulation resistor, the resistor is turned on and off according to a clock of the data stream, and the on and off of a switch S are controlled by binary data encoding. A circuit schematic diagram of the resistive load modulation is shown in FIG. 5.

In the capacitive load modulation, the load is connected in parallel with a capacitor, replacing the load modulation resistor controlled by the binary data encoding in FIG. 5.

In order to facilitate a better understanding of the embodiments of the present application, encoding technologies related to the present application are explained.

The data transmitted by the electronic tag may be represented as binary "1" and "0" by using different forms of codes. The wireless radio frequency identification system usually uses one of the following encoding methods: Non Return Zero (NRZ) encoding, Manchester encoding, Unipolar RZ encoding, Differential Bi-Phase (DBP) encoding, Miller encoding and differential encoding. In general terms, 0 and 1 are represented by using different pulse signals.

In order to facilitate a better understanding of the embodiments of the present application, the energy supply signal in the zero-power consumption communication system related to the present application is explained.

In terms of energy supply signal carriers, it may be a base station, a smart phone, a smart gateway, a charging station, a micro base station, etc.

In terms of frequency bands, a radio wave used for energy supply may be in a low frequency, an intermediate frequency, or a high frequency, etc.

In terms of waveforms, a radio wave used for energy supply may be a sine wave, a square wave, a triangle wave, a pulse, a rectangular wave, etc. In addition, the radio wave used for energy supply may be a continuous wave, or a non-continuous wave (i.e., a certain time interruption is allowed).

The energy supply signal may be a certain signal specified in the 3rd Generation Partnership Project (3GPP) standard, for example, a sounding reference signal (SRS), a physical uplink shared channel (PUSCH), a physical random access channel (PRACH), a physical uplink control channel (PUCCH), a physical downlink control channel (PDCCH), a physical downlink shared channel (PDSCH), a physical broadcast channel (PBCH), etc.

In order to facilitate a better understanding of the embodiments of the present application, a trigger signal in the zero-power consumption communication system related to the present application is explained.

In terms of trigger signal carriers, it may be a base station, a smart phone, a smart gateway, etc.

In terms of frequency bands, a radio wave used for triggering may be in a low frequency, an intermediate frequency, or a high frequency, etc.

In terms of waveforms, a radio wave used for triggering may be a sine wave, a square wave, a triangle wave, a pulse, a rectangular wave, etc. In addition, the radio wave used for triggering may be a continuous wave, or a non-continuous wave (i.e., a certain time interruption is allowed).

The trigger signal may be a certain signal specified in the 3GPP standard, for example, an SRS, a PUSCH, a PRACH, a PUCCH, a PDCCH, a PDSCH, a PBCH, etc.; or it may also be a new signal.

In order to facilitate a better understanding of the embodiments of the present application, a cellular passive Internet of Things related to the present application is explained.

With the increase of 5G industry applications, there are more and more types and application scenarios of connected objects, there will be higher requirements on the price and power consumption of communication terminals, the application of battery-free, low-cost passive Internet of Things devices becomes a key technology of the cellular IoT, which enriches the types and number of 5G network-linked terminals, and truly implements the Internet of Everything. Herein, the passive Internet of Things device may be based on the existing zero-power consumption device, such as RFID technology, and extended on this basis, to be applicable for the cellular IoT.

In order to facilitate a better understanding of the embodiments of the present application, the classification of zero-power consumption terminals related to the present application is explained.

Based on energy sources and usages of zero-power consumption terminals, the zero-power consumption terminals may be divided into the following types.

1) Passive Zero-Power Consumption Terminal

The zero-power consumption terminal does not need an internal battery, and when the zero-power consumption terminal is close to a network device (such as a reader/writer of the RFID system), the zero-power consumption terminal is within a near field range formed by antenna radiation of the network device. Therefore, an antenna of the zero-power consumption terminal generates an induced current by electromagnetic induction, and the induced current drives the low-power consumption chip circuit of the zero-power consumption terminal. Tasks such as demodulation of a forward link signal and modulation of a backward link signal, etc., are implemented. For the back scattering link, the zero-power consumption terminal uses the back scattering implementation to transmit a signal.

It can be seen that the passive zero-power consumption terminal does not need an internal battery to drive either the forward link or the backward link, and is a truly zero-power consumption terminal.

The passive zero-power consumption terminal does not need a battery, and a radio frequency circuit and a baseband circuit of the passive zero-power consumption terminal both are very simple, for example, do not need a low-noise amplifier (LNA), a power amplifier (PA), a crystal oscillator, an analog-to-digital converter (ADC) and other devices, therefore, the passive zero-power consumption terminal has many advantages, such as small size, light weight, very cheap price, and long service life, etc.

2) Semi-Passive Zero-Power Consumption Terminal

The semi-passive zero-power consumption terminal is not equipped with a conventional battery itself, but may use an RF energy harvesting module to harvest radio wave energy, and at the same time, store the harvested energy in an energy storage unit (such as a capacitor). The energy storage unit, after obtaining the energy, may drive the low-power consumption chip circuit of the zero-power consumption terminal. Tasks such as demodulation of a forward link signal and modulation of a backward link signal, etc., are implemented. For a back scattering link, the zero-power consumption terminal uses the back scattering implementation to transmit a signal.

It can be seen that the semi-passive zero-power consumption terminal does not need an internal battery to drive either the forward link or the backward link. Although the energy stored in the capacitor is used in the operation, the energy comes from the radio energy harvested by the energy harvesting module, therefore, the semi-passive zero-power consumption terminal is also a truly zero-power consumption terminal.

The semi-passive zero-power consumption terminal inherits many of advantages of the passive zero-power consumption terminal, so they have many advantages, such as small size, light weight, very cheap price, and long service life, etc.

3) Active Zero-Power Consumption Terminal

The zero-power consumption terminal used in some scenarios may also be an active zero-power consumption terminal, this type of terminal may have an internal battery. The battery is used to drive a low-power consumption chip circuit of the zero-power consumption terminal. Tasks such as demodulation of a forward link signal and modulation of a backward link signal, etc., are implemented. However, for a back scattering link, the zero-power consumption terminal uses the back scattering implementation to transmit a signal. Therefore, the zero-power consumption of this type of terminal is mainly reflected in the fact that the signal transmission of the backward link does not need the terminal's own power, but uses the method of back scattering.

The internal battery of the active zero-power consumption terminal supplies power to the RFID chip, to increase the reading and writing distance of the tag and improve the reliability of communication. Therefore, it is applied in some scenarios with relatively high requirements on the communication distance, the reading latency, etc.

In order to facilitate a better understanding of the embodiments of the present application, the anti-collision processing related to the present application is explained.

Generally speaking, there may be a plurality of electronic tags simultaneously within a working range of a reader/writer. The plurality of electronic tags transmit data to the reader/writer simultaneously, which will cause a collision of the data of the electronic tags and make the reader/writer unable to read relevant data of each electronic tag normally. In the wireless communication, there are four anti-collision solutions for the data collision, which are a space division multiplexing method, a frequency division multiplexing method, a time division multiplexing method and a code division multiplexing method, respectively.

The key to solving the anti-collision problem is an optimized anti-collision algorithm. The RFID anti-collision algorithm is mainly based on a Tridiagonal Matrices (TDMA) algorithm, which may be divided into an ALOHA anti-collision algorithm and a binary-based search algorithm. The anti-collision algorithm may enable higher system throughput and channel utilization, fewer slots required, and higher data accuracy.

The polling algorithm and binary search algorithm are both the anti-collision algorithm of the RFID based on TDMA.

The polling algorithm is to continuously transmit inquiry commands to the tag, and the command contains a serial number. After receiving the command, the tag checks whether the serial number in the command is the same as its own serial number, and if they are different, the tag will not reply. If the reader/writer does not receive a reply within a specified period of time, it will again transmit an inquiry command containing another serial number, until there is a serial number of a tag meeting the requirement, and then the data communication with the reader/writer is completed. It can be seen that the efficiency of this algorithm is very low.

The binary search algorithm is that after receiving a reply from the tag, the reader/writer detects a bit that causes the collision, and transmits an inquiry command that can group the tag, according to a detected situation. After receiving the command, a tag checks whether it is in a group that allows communication, and If so, it continues to reply, until there is only one tag, and then the data exchange with the reader/writer is completed. And so on, until data exchanges between all tags and the reader/writer are completed.

A pure ALOHA algorithm is a process of random access or contention transmission. A sender may perform conflict detection in a data transmission procedure and compare the received data with data in a buffer to know whether a data frame is corrupted. If the sender knows that the data frame is corrupted (i.e., the collision is detected), it may retransmit the frame after waiting for a random period of time.

A frame slot ALOHA algorithm is that the electronic tag randomly selects a slot in each frame to transmit data. All electronic tags must reply synchronously, that is, all electronic tags can only transmit information to the reader/writer at a beginning point of the slot, and the slot for the transmission by each electronic tag is randomly selected.

Based on the Binary Search (BS), there are a binary tree search algorithm and a binary tree search algorithm with pruned branches. A basic idea of the BS is to divide tags in the collision into two subsets 0 and 1, query the subsets, and if there is no collision, tags are identified correctly; if there is a collision, the tags are split (for example, the subset 1 is split into two subsets 00 and 01), until all tags in the subsets are identified.

To facilitate the understanding of the technical solutions of the embodiments of the present application, problems solved by the present application are explained.

In the zero-power consumption communication, the zero-power consumption terminal needs to harvest the radio wave transmitted by a network node to obtain energy before it can drive itself to work. With the development of industry, the number of devices accessed to the network is increased dramatically, and the number of zero-power consumption devices applied in the cellular system will also be very huge. In some typical scenarios, such as logistics warehousing management, supermarket shopping, etc., a large number of tags need to be accessed, and at the same time, all tags are further required to be identified. The traditional conflict solution mechanisms described above, although being able to do so without missing tags, usually have a large latency. Therefore, it is necessary to introduce a new anti-collision solution mechanism in the zero-power consumption communication of the cellular network.

Based on the above problems, a solution of back scattering communication is provided by the present application, that different communication devices transmit back scattering signals in a time-division manner, which can avoid the conflict between different communication devices during the back scattering communication.

In the embodiments, a method of back scattering communication is provided, the method includes:

determining by a first communication device, time domain resource information for the back scattering communication according to first information;

where the first information is identification information of the first communication device, or the first information is identification information of the first communication device and identification information of a serving cell.

In some embodiments, the time domain resource information for the back scattering communication includes at least one of: a starting location of a time domain resource for the back scattering communication, or a back scattering occasion for the back scattering communication.

In some embodiments, the time domain resource information for the back scattering communication includes a starting location of a time domain resource for the back scattering communication;

determining by the first communication device, the time domain resource information for the back scattering communication according to the first information, includes:

determining by the first communication device, a first duration according to the first information; and determining by the first communication device, the starting location of the time domain resource for the back scattering communication according to the first duration and a first time domain location.

In some embodiments, the determining by the first communication device, the starting location of the time domain resource for the back scattering communication according to the first duration and the first time domain location, includes:

determining by the first communication device, the starting location of the time domain resource for the back scattering communication according to the following formula:

$$T_{start} = T_0 + T;$$

where $T_{start}$ denotes the starting location of the time domain resource for the back scattering communication, $T_0$ denotes the first time domain location, and T denotes the first duration.

In some embodiments, the first time domain location is determined based on a first scheduling signal for scheduling or triggering the back scattering communication.

In some embodiments, the first time domain location is a moment at which the first communication device receives the first scheduling signal, or the first time domain location is a starting time domain location at which the first communication device receives the first scheduling signal, or the first time domain location is an ending time domain location at which the first communication device receives the first scheduling signal, or the first time domain location is a time unit in which the first scheduling signal is located, or the first time domain location is a time unit in which a starting time domain location of the first scheduling signal is located, or the first time domain location is a time unit in which an ending time domain location of the first scheduling signal is located, or the first time domain location is indicated by the first scheduling signal.

In some embodiments, the first time domain location is pre-configured, or the first time domain location is agreed by a protocol, or the first time domain location is indicated by a second communication device by a signal other than a first scheduling signal for scheduling or triggering the back scattering communication.

In some embodiments, the method further includes:

determining by the first communication device, the first duration from N durations according to the following formula, where N is a positive integer:

$$(UE_{ID} \bmod N)+1, \text{ or } (UE_{ID} \vee Cell_{ID}) \bmod N+1,$$

$$\text{or } (UE_{ID} \wedge Cell_{ID}) \bmod N+1;$$

where $UE_{ID}$ denotes an identification of the first communication device, $Cell_{ID}$ denotes a serving cell identification, $\vee$ denotes an OR operation, $\wedge$ denotes an AND operation, and mod denotes a modulo operation.

In some embodiments, the method further includes:

determining by the first communication device, the first duration from N durations according to the following formula, where N is a positive integer:

$$(UE_{ID} \vee Cells_{ID}) \bmod T_{max}, \text{ or, } UE_{ID} \bmod T_{max};$$

where $UE_{ID}$ denotes an identification of the first communication device, $Cell_{ID}$ denotes a serving cell identification, $\vee$ denotes an OR operation, $T_{max}$ denotes a maximum value of the first duration, and mod denotes a modulo operation.

In some embodiments, the $T_{max}$ is pre-configured, or the $T_{max}$ is configured by a second communication device, or the $T_{max}$ is semi-statically configured, or the $T_{max}$ is configured by a second communication device by a first scheduling signal for scheduling or triggering the back scattering communication, or the $T_{max}$ is configured by a second communication device by a signal other than a first scheduling signal for scheduling or triggering the back scattering communication.

In some embodiments, the N durations are pre-configured, or the N durations are configured by a second communication device, or the N durations are semi-statically configured, or the N durations are configured by a second communication device by a first scheduling signal for scheduling or triggering the back scattering communication, or the N durations are configured by a second communication device by a signal other than a first scheduling signal for scheduling or triggering the back scattering communication.

In some embodiments, the time domain resource information for the back scattering communication includes a back scattering occasion for the back scattering communication;

determining by the first communication device, the time domain resource information for the back scattering communication according to the first information, includes:

determining by the first communication device, the back scattering occasion for the back scattering communication from at least one available back scattering occasion according to the first information.

In some embodiments, the at least one available back scattering occasion is determined based on a time domain resource structure.

In some embodiments, the at least one available back scattering occasion is a part or all of time units in the time domain resource structure that are available for back scattering.

In some embodiments, the time domain resource structure is indicated by a second communication device by a first scheduling signal for scheduling or triggering the back scattering communication, or the time domain resource structure is indicated by a second communication device by a signal other than a first scheduling signal for scheduling or triggering the back scattering communication, or the time domain resource structure is semi-statically configured by a second communication device, or the time domain resource structure is agreed by a protocol.

In some embodiments, the at least one available back scattering occasion is a part or all of back scattering occasions in a first time domain resource set.

In some embodiments, the first time domain resource set is indicated by a second communication device by a first scheduling signal for scheduling or triggering the back scattering communication, or the first time domain resource set is indicated by a second communication device by a signal other than a first scheduling signal for scheduling or triggering the back scattering communication, or the first time domain resource set is semi-statically configured by a second communication device.

In some embodiments, the method further includes:

determining by the first communication device, the at least one available back scattering occasion according to a length of the first time domain resource set and a back scattering occasion location in the first time domain resource set.

In some embodiments, the at least one available back scattering occasion is a part or all of back scattering occasions in a first back scattering occasion pattern;

where the first back scattering occasion pattern indicates a time domain location of a back scattering occasion that is available for the back scattering communication, in a first time domain resource set.

In some embodiments, the first back scattering occasion pattern is indicated by a second communication device by a first scheduling signal for scheduling or triggering the back scattering communication, or, the first back scattering occasion pattern is indicated by a second communication device by a signal other than a first scheduling signal for scheduling or triggering the back scattering communication, or, the first back scattering occasion pattern is semi-statically configured by a second communication device.

In some embodiments, the first back scattering occasion pattern is determined by the first communication device from a plurality of back scattering occasion patterns based on the identification information of the first communication device, or the first back scattering occasion pattern is determined by the first communication device from a plurality of back scattering occasion patterns based on the identification information of the first communication device and the identification information of the serving cell, or the first back scattering occasion pattern is determined by the first communication device from a plurality of back scattering occasion patterns based on identification information of a terminal group to which the first communication device belongs, or the first back scattering occasion pattern is determined by the first communication device from a plurality of back scattering occasion patterns based on identification information of a terminal group to which the first communication device belongs and the identification information of the serving cell.

In some embodiments, the method further includes:

determining by the first communications device, the first back scattering occasion pattern from the plurality of back scattering occasion patterns according to the following formula:

$$(UE_{ID}\bmod N)+1,\text{ or }(UE_{ID}\vee Cell_{ID})\bmod N+1,$$

$$\text{or }(UE_{ID}\wedge Cell_{ID})\bmod N+1;$$

where N is a number of the plurality of back scattering occasion patterns, $UE_{ID}$ denotes an identification of the first communication device, $Cell_{ID}$ denotes a serving cell identification, $\vee$ denotes an OR operation, $\wedge$ denotes an AND operation, and mod denotes a modulo operation.

In some embodiments, the method further includes:

determining by the first communications device, the first back scattering occasion pattern from the plurality of back scattering occasion patterns according to the following formula:

$$(UE_{groupID}\bmod N)+1,\text{ or }(UE_{groupID}\vee Cell_{ID})\bmod N+1,$$

$$\text{or }(UE_{groupID}\wedge Cell_{ID})\bmod N+1;$$

where N is a number of the plurality of back scattering occasion patterns, $UE_{groupID}$ denotes an identification of the terminal group to which the first communication device belongs, $Cell_{ID}$ denotes a serving cell identification, $\vee$ denotes an OR operation, $\wedge$ denotes an AND operation, and mod denotes a modulo operation.

In some embodiments, the plurality of back scattering occasion patterns are indicated by a second communication device by a first scheduling signal for scheduling or triggering the back scattering communication, or the plurality of back scattering occasion patterns are pre-configured, or the plurality of back scattering occasion patterns are agreed by a protocol, or the plurality of back scattering occasion patterns are semi-statically configured by a second communication device.

In some embodiments, in a time domain, the plurality of back scattering occasion patterns do not overlap with each other, or the plurality of back scattering occasion patterns partially overlap with each other.

In some embodiments, the method further includes:

transmitting by the first communication device, a back scattering signal according to a determined time domain resource for the back scattering communication.

In some embodiments, the back scattering signal is obtained by scrambling the identification information of the first communication device.

In some embodiments, the first communication device obtains energy by energy harvesting, to be used for communication, information collecting and processing.

In some embodiments, the method further includes:

in a case where a first scheduling signal for scheduling or triggering the back scattering communication is an energy supply signal of the first communication device, monitoring by the first communication device, the first scheduling signal during the energy harvesting.

In some embodiments, the method further includes:

in a case where an energy supply signal of the first communication device does not include scheduling information, monitoring by the first communication device, a first scheduling signal for scheduling or triggering the back scattering communication, after the energy harvesting.

In the embodiments, a method of back scattering communication is provided, the method includes:

transmitting by a second communication device, a first scheduling signal, where the first scheduling signal is used to schedule or trigger the back scattering communication;

receiving by the second communication device, a back scattering signal transmitted by a first communication device; where the back scattering signal is transmitted by the first communication device based on time domain resource information for the back scattering communication, the time domain resource information for the back scattering communication is determined by the first communication device based on first information, the first information is identification information of the first communication device, or the first information is identification information of the first communication device and identification information of a serving cell.

In some embodiments, the method further includes:

determining by the second communication device, the identification information of the first communication device according to a time unit for transmitting the first scheduling signal and a time unit for receiving the back scattering signal;

descrambling by the second communication device, the back scattering signal according to the identification information of the first communication device.

In some embodiments, the time domain resource information for the back scattering communication includes at least one of: a starting location of a time domain resource for the back scattering communication, or a back scattering occasion for the back scattering communication.

In some embodiments, the time domain resource information for the back scattering communication includes a starting location of a time domain resource for the back scattering communication;

where the starting location of the time domain resource for the back scattering communication is determined by the first communication device based on a first duration and a first time domain location, and the first duration is determined by the first communication device based on the first information.

In some embodiments, the starting location of the time domain resource for the back scattering communication is determined by the first communication device according to the following formula:

$$T_{start} = T_0 + T;$$

where $T_{start}$ denotes the starting location of the time domain resource for the back scattering communication, $T_0$ denotes the first time domain location, and T denotes the first duration.

In some embodiments, the first time domain location is determined based on the first scheduling signal.

In some embodiments, the first time domain location is a moment at which the first communication device receives the first scheduling signal, or the first time domain location is a starting time domain location at which the first communication device receives the first scheduling signal, or the first time domain location is an ending time domain location at which the first communication device receives the first scheduling signal, or the first time domain location is a time unit in which the first scheduling signal is located, or the first time domain location is a time unit in which a starting time domain location of the first scheduling signal is located, or the first time domain location is a time unit in which an ending time domain location of the first scheduling signal is located, or the first time domain location is indicated by the first scheduling signal.

In some embodiments, the first time domain location is pre-configured, or the first time domain location is agreed by a protocol, or the first time domain location is configured by the second communication device by a signal other than the first scheduling signal.

In some embodiments, the first duration is determined by the first communication device from N durations according to the following formula, where N is a positive integer:

$$(UE_{ID} \bmod N) + 1, \text{ or } (UE_{ID} \vee Cell_{ID}) \bmod N + 1,$$
$$\text{or } (UE_{ID} \wedge Cell_{ID}) \bmod N + 1;$$

where $UE_{ID}$ denotes an identification of the first communication device, $Cell_{ID}$ denotes a serving cell identification, $\vee$ denotes an OR operation, $\wedge$ denotes an AND operation, and mod denotes a modulo operation.

In some embodiments, the first duration is determined by the first communication device from N durations according to the following formula, where N is a positive integer:

$$(UE_{ID} \vee Cell_{ID}) \bmod T_{max}, \text{ or, } UE_{ID} \bmod T_{max};$$

where $UE_{ID}$ denotes an identification of the first communication device, $Cell_{ID}$ denotes a serving cell identification, $\vee$ denotes an OR operation, $T_{max}$ denotes a maximum value of the first duration, and mod denotes a modulo operation.

In some embodiments, the $T_{max}$ is pre-configured, or the $T_{max}$ is configured by the second communication device, or the $T_{max}$ is semi-statically configured, or the $T_{max}$ is configured by the second communication device by the first scheduling signal, or the $T_{max}$ is configured by the second communication device by a signal other than the first scheduling signal.

In some embodiments, the N durations are pre-configured, or the N durations are configured by the second communication device, or the N durations are semi-statically configured, or the N durations are configured by the second communication device by the first scheduling signal, or the N durations are configured by the second communication device by a signal other than the first scheduling signal.

In some embodiments, the time domain resource information for the back scattering communication includes a back scattering occasion for the back scattering communication;

where the back scattering occasion for the back scattering communication is determined by the first communication device from at least one available back scattering occasion based on the first information.

In some embodiments, the at least one available back scattering occasion is determined based on a time domain resource structure.

In some embodiments, the at least one available back scattering occasion is a part or all of time units in the time domain resource structure that are available for back scattering.

In some embodiments, the time domain resource structure is indicated by the second communication device by the first scheduling signal, or the time domain resource structure is indicated by the second communication device by a signal other than the first scheduling signal, or the time domain resource structure is semi-statically configured by the second communication device, the time domain resource structure is agreed by a protocol.

In some embodiments, the at least one available back scattering occasion is a part or all of back scattering occasions in a first time domain resource set.

In some embodiments, the first time domain resource set is indicated by the second communication device by the first scheduling signal, or the first time domain resource set is indicated by the second communication device by a signal other than the first scheduling signal, or the first time domain resource set is semi-statically configured by the second communication device.

In some embodiments, the at least one available back scattering occasion is determined by the first communication device based on a length of the first time domain resource set and a back scattering occasion location in the first time domain resource set.

In some embodiments, the at least one available back scattering occasion is a part or all of back scattering occasions in a first back scattering occasion pattern;

where the first back scattering occasion pattern indicates a time domain location of a back scattering occasion that is available for the back scattering communication, in a first time domain resource set.

In some embodiments, the first back scattering occasion pattern is indicated by the second communication device by the first scheduling signal, or the first back scattering occasion pattern is semi-statically configured by the second communication device.

In some embodiments, the first back scattering occasion pattern is determined by the first communication device from a plurality of back scattering occasion patterns based on the identification information of the first communication device, or the first back scattering occasion pattern is determined by the first communication device from a plurality of back scattering occasion patterns based on the identification information of the first communication device and the identification information of the serving cell, or the first back scattering occasion pattern is determined by the first communication device from a plurality of back scattering occasion patterns based on identification information of a terminal group to which the first communication device belongs, or the first back scattering occasion pattern is determined by the first communication device from a plurality of back scattering occasion patterns based on identification information of a terminal group to which the first communication device belongs and the identification information of the serving cell.

In some embodiments, the first back scattering occasion pattern is determined by the first communication device from the plurality of back scattering occasion patterns based on the following formula:

$$(UE_{ID}\text{mod}N)+1,\text{ or }(UE_{ID}\vee Cell_{ID})\text{mod}N+1,$$
$$\text{or }(UE_{ID}\wedge Cell_{ID})\text{mod}N+1;$$

where N is a number of the plurality of back scattering occasion patterns, $UE_{ID}$ denotes an identification of the first communication device, $Cell_{ID}$ denotes a serving cell identification, $\vee$ denotes an OR operation, $\wedge$ denotes an AND operation, and mod denotes a modulo operation.

In some embodiments, the first back scattering occasion pattern is determined by the first communication device from the plurality of back scattering occasion patterns based on the following formula:

$$(UE_{groupID}\text{mod}N)+1,\text{ or }(UE_{groupID}\vee Cell_{ID})\text{mod}N+1,$$
$$\text{or }(UE_{groupID}\wedge Cell_{ID})\text{mod}N+1;$$

where N is a number of the plurality of back scattering occasion patterns, $UE_{groupID}$ denotes an identification of the terminal group to which the first communication device belongs, $Cell_{ID}$ denotes a serving cell identification, $\vee$ denotes an OR operation, $\wedge$ denotes an AND operation, and mod denotes a modulo operation.

In some embodiments, the plurality of back scattering occasion patterns are indicated by the second communication device by the first scheduling signal, or the plurality of back scattering occasion patterns are pre-configured, or the plurality of back scattering occasion patterns are agreed by a protocol, or the plurality of back scattering occasion patterns are semi-statically configured by the second communication device.

In some embodiments, in a time domain, the plurality of back scattering occasion patterns do not overlap with each other, or the plurality of back scattering occasion patterns partially overlap with each other.

In some embodiments, the back scattering signal is obtained by scrambling the identification information of the first communication device.

In some embodiments, the first scheduling signal is an energy supply signal of the first communication device.

In some embodiments, the method further includes:

transmitting by the second communication device, an energy supply signal of the first communication device, to the first communication device.

The technical solutions of the present application are described in detail below by exemplary embodiments.

FIG. 6 is a schematic flow chart of a method 200 of back scattering communication, according to the embodiments of the present application, and as shown in FIG. 6, the method 200 of back scattering communication may include at least some of the following contents:

S210, determining by a first communication device, time domain resource information for the back scattering communication according to first information; where the first information is identification information of the first communication device, or the first information is identification information of the first communication device and identification information of a serving cell.

In the embodiments of the present application, the back scattering communication may be communication between the first communication device and a second communication device. For example, the first communication device is a terminal device, and the second communication device is a network device, that is, the communication between the first communication device and the second communication device may be uplink and downlink communication. For another example, the first communication device is a terminal device, and the second communication device is another terminal device, that is, the communication between the first communication device and the second communication device may be sidelink communication.

In the following, the first communication device is taken as a terminal device and the second communication device is taken as a network device as an example to explain.

In some embodiments, the identification information of the terminal device may be a terminal identification (UE ID), or other information used to identify the terminal device, such as a terminal index, etc., which is not limited by the present application.

In some embodiments, the identification information of the serving cell may be a cell identification (Identity, ID), or other information used to identify the serving cell, such as a cell index, etc., which is not limited by the present application.

The embodiments of the present application may be applied to a cellular Internet of Things system, such as a cellular passive Internet of Things system, or may also be applied to other scenarios in which the terminal device transmits information to the network device in a zero-power consumption communication manner or a battery-free communication manner, but the present application is not limited thereto.

The embodiments of the present application may be applicable to one-to-many communication modes such as broadcast, multicast, and packet paging, etc. In some embodiments, for example, when the network device transmits a broadcast message, a multicast message, a packet paging message, etc., there may be a plurality of zero-power consumption devices responding, and at this time, an anti-collision mechanism needs to be designed for the zero-power consumption communication, to reduce the collision between the zero-power consumption devices. In the embodiments of the present application, back scattering signals are transmitted by different terminals in a time-division manner, which can avoid the conflict between different terminals during the back scattering communication. Of course, the embodiments of the present application are also applicable to one-to-one communication modes, which is not limited by the present application.

In some embodiments, the terminal device may be a zero-power consumption terminal; for example, the terminal device obtains energy by energy harvesting, to be used for communication, information collecting and processing.

In some embodiments, the terminal device may also be other terminals, such as a terminal that may achieve communication, information collecting and processing without the energy harvesting. The present application is not limited thereto.

In the cellular network, due to no battery to supply energy, the zero-power consumption device needs to obtain energy for communication by the energy harvesting, and on the one hand, it may perform the energy harvesting on environmental energy such as thermal energy, light energy, kinetic energy, etc., on the other hand, it may perform the energy harvesting on radio frequency signals, to obtain energy for communication, and then perform a corresponding communication procedure based on the back scattering. Typically, a signal for the energy harvesting (i.e., an energy supply signal) may be provided by the network device or a dedicated energy node. When the communication is performed based on scheduling, the network device needs to provide control information to schedule the information transmission, which may be referred to as a scheduling signal/trigger signal. The trigger signal and the energy supply signal may be a same signal or two independent signals. When the communication is performed by the zero-power consumption device, a carrier capable of carrying the communication is needed, and the carrier may be a signal independent from the energy supply signal and the trigger signal, or may be one signal with the energy supply signal, or one signal with the trigger signal.

In the embodiments of the present application, frequency bands of the energy supply signal, the carrier signal, and the trigger signal may be completely different, completely the same, or partially the same. The network device continuously or intermittently transmits the energy supply signal in a certain frequency band, the zero-power consumption device harvests energy, and after obtaining the energy, the zero-power consumption device may perform the corresponding communication procedure, such as measuring, receiving a channel/signal, transmitting a channel/signal, etc.

In some embodiments, the terminal device transmits a back scattering signal according to the determined time domain resource for the back scattering communication.

In some embodiments, the back scattering signal is obtained by scrambling the identification information of the terminal device. In some embodiments, for example, the terminal device obtains the back scattering signal by scrambling a cyclic redundancy check (CRC) based on its UE ID.

In the embodiments of the present application, the terminal device receives a first scheduling signal for scheduling or triggering the back scattering communication, transmitted by the network device, and after receiving the first scheduling signal, the terminal device determines the time domain resource information for the back scattering communication based on the first information. Further, in response to the first scheduling signal, the terminal device transmits a back scattering signal according to the determined time domain resource for the back scattering communication.

In some embodiments, the terminal device obtains energy by energy harvesting, to be used for communication, information collecting and processing. And in a case where the first scheduling signal is an energy supply signal of the terminal device, the terminal device monitors the first scheduling signal in the energy harvesting procedure. Or, in a case where the energy supply signal of the terminal device does not contain scheduling information, the terminal device monitors the first scheduling signal after the energy harvesting.

In some embodiments, the first scheduling signal may be a broadcast signal or a multicast signal transmitted by the network device to the zero-power consumption terminal within a coverage range, or the first scheduling signal may be a paging signal transmitted by the network device to a certain group of zero-power consumption terminals, or the first scheduling signal may be other control signals transmitted by the network device to a zero-power consumption terminal within a coverage range, etc.

In some embodiments, the time domain resource information for the back scattering communication includes but not limited to at least one of: a starting location of a time domain resource for the back scattering communication, or a back scattering occasion for the back scattering communication.

In some embodiments, the time domain resource for the back scattering communication may be referred to as a back scattering occasion (backscatter occasion, BO). In other words, the back scattering occasion described herein is the time domain resource for the back scattering communication.

Example 1: the time domain resource information for the back scattering communication includes a starting location of a time domain resource for the back scattering communication. S210 described above may include: determining by the terminal device, a first duration according to the first information; and determining by the terminal device, the starting location of the time domain resource for the back scattering communication according to the first duration and a first time domain location.

In some implementations of Example 1, the terminal device may be configured with N durations, and the terminal device may determine the first duration from the N durations based on the first information, where N is a positive integer.

In some embodiments, for example, the terminal device determines the first duration corresponding to the terminal device from the N durations according to a UE ID, or the UE ID and a cell ID.

Optionally, the network device may semi-statically configure X durations, where X is a positive integer; and the network device indicates the N durations of the X durations by the first scheduling signal, or the network device indicates the N durations of the X durations by a signal other than the first scheduling signal.

Optionally, the network device indicates the N durations by the first scheduling signal, or the network device indicates the N durations by a signal other than the first scheduling signal.

In some implementations of Example 1, the terminal device may determine an index of the first duration used by the terminal device from the N durations based on the following formula 1:

$$(UE_{ID} \bmod N)+1 \quad \text{formula 1}$$

where $UE_{ID}$ denotes an identification of the terminal device, and mod denotes a modulo operation.

In some implementations, the above formula 1 may also be ($UE_{ID}$ mod N).

In some implementations of Example 1, the terminal device may determine an index of the first duration used by the terminal device from the N durations based on the following formula 2 or formula 3:

$$(UE_{ID} \vee Cell_{ID}) \bmod N+1 \quad \text{formula 2}$$

$$(UE_{ID} \wedge Cell_{ID}) \bmod N+1 \quad \text{formula 3}$$

where $UE_{ID}$ denotes an identifier of the terminal device, $Cell_{ID}$ denotes a serving cell identification, $\vee$ denotes an OR operation, $\wedge$ denotes an AND operation, and mod denotes a modulo operation.

In some implementations, the above formula 2 may also be ($UE_{ID} \vee Cell_{ID}$) mod N, and the above formula 3 may also be ($UE_{ID} \wedge Cell_{ID}$) mod N.

In some implementations, the "OR operation" in the above formula 2 may also be replaced by an "XOR operation" or an "XNOR operation". The "AND operation" in the above formula 3 may also be replaced by the "XOR operation" or the "XNOR operation".

Optionally, in Example 1, a unit of the first duration may be a basic unit for the back scattering communication, such as a symbol, a slot, a subframe, a frame, or other units, etc.

In some implementations of Example 1, the terminal device may determine the first duration based on the following formula 4:

$$(UE_{ID} \vee Cell_{ID}) \bmod T_{max} \quad \text{formula 4}$$

where $UE_{ID}$ denotes an identification of the terminal device, $Cell_{ID}$ denotes a serving cell identification, $\vee$ denotes an OR operation, $T_{max}$ denotes a maximum value of the first duration, and mod denotes a modulo operation.

In some implementations, the "OR operation" in the above formula 4 may also be replaced by an "AND operation" or an "XOR operation" or an "XNOR operation".

In some implementations of Example 1, the terminal device may determine the first duration based on the following formula 5:

$$UE_{ID} \bmod T_{max} \quad \text{formula 5}$$

where $UE_{ID}$ denotes an identification of the terminal device, $T_{max}$ denotes a maximum value of the first duration, and mod denotes a modulo operation.

Optionally, $T_{max}$ may be pre-configured, or $T_{max}$ may be configured by the network device, or $T_{max}$ may be semi-statically configured, or $T_{max}$ may be configured by the network device by the first scheduling signal, or $T_{max}$ may be configured by the network device by a signal other than the first scheduling signal, or $T_{max}$ may be configured by the network device by other control information (carried by a signal other than the first scheduling signal).

In some implementations of Example 1, the terminal device determines the starting location of the time domain resource for the back scattering communication according to the following formula 6:

$$T_{start}=T_0+T \quad \text{formula 6}$$

where $T_{start}$ denotes the starting location of the time domain resource for the back scattering communication, $T_0$ denotes the first time domain location, and T denotes the first duration.

In some embodiments, for example, a unit of T may be an absolute time unit such as microsecond (us), millisecond (ms), or second(s). The zero-power consumption device performs the back scattering communication at the moment $T_0$+T, based on the moment $T_0$ at which the first scheduling signal is received.

In some embodiments, for another example, a unit of T may be a symbol, a slot, a subframe, a frame, a basic time unit in the zero-power consumption communication, etc. The zero-power consumption device performs the back scattering communication after the T-th time unit after a time unit in which the first scheduling signal is received. For example: if the unit of T is an orthogonal frequency-division multiplexing (OFDM) symbol, the terminal device performs the back scattering communication after T OFDM symbols after receiving the first scheduling signal; if the unit of T is a slot, the terminal device performs the back scattering communication at a starting location of a T-th slot after a slot in which the first scheduling signal is received.

In some embodiments, for another example, the unit of T and $T_0$ may be an absolute time unit, such as us, ms, or s, etc. The zero-power consumption device performs the back scattering communication at the moment $T_0$+T based on $T_0$ indicated by the received first scheduling signal.

In some embodiments, for another example, the unit of T and $T_0$ may be a symbol, a slot, a subframe, a frame, a basic time unit in the zero-power consumption communication, etc. The zero-power consumption device performs the back scattering communication after T time units after the time unit $T_0$ indicated by the received first scheduling signal. For example: if the unit of T and $T_0$ is an OFDM symbol, the back scattering communication is performed after T OFDM symbols after $T_0$ indicated by the received first scheduling signal; if the unit of T and $T_0$ is a time slot, the back scattering communication is performed at a starting location of a T-th time slot after the $T_0$ slot indicated by the received first scheduling signal.

In some implementations, the first time domain location is determined based on the first scheduling signal for scheduling or triggering the back scattering communication. In some embodiments, the first time domain location is a moment at which the terminal device receives the first scheduling signal, or the first time domain location is a starting time domain location when the terminal device receives the first scheduling signal, or the first time domain location is an ending time domain location at which the terminal device receives the first scheduling signal, or the first time domain location is a time unit in which the first scheduling signal is located, or the first time domain location is a time unit in which a starting time domain location of the first scheduling signal is located, or the first time domain location is a time unit in which an ending time domain location of the first scheduling signal is located, or the first time domain location is indicated by the first scheduling signal.

It should be noted that the moment at which the terminal device receives the first scheduling signal may be expressed by an absolute time unit, such as us, ms, s, etc. The starting time domain location at which the terminal device receives the first scheduling signal may be expressed by an absolute time unit, such as us, ms, s, etc., or expressed by a time unit such as a symbol, a slot, a subframe, a frame, etc. The ending time domain location at which the terminal device receives the first scheduling signal may be expressed by an absolute time unit, such as us, ms, s, etc., or expressed by a time unit such as a symbol, a slot, a subframe, a frame, etc. The time unit associated with the first time domain location may be a time unit, such as a symbol, a slot, a subframe, or a frame, etc.

In some implementations, the first time domain location is pre-configured, or the first time domain location is agreed by a protocol.

In some implementations, the first time domain location may also be indicated by the network device by a signal other than the first scheduling signal. For example, the network device indicates the first time domain location by control information.

Figure 7A:
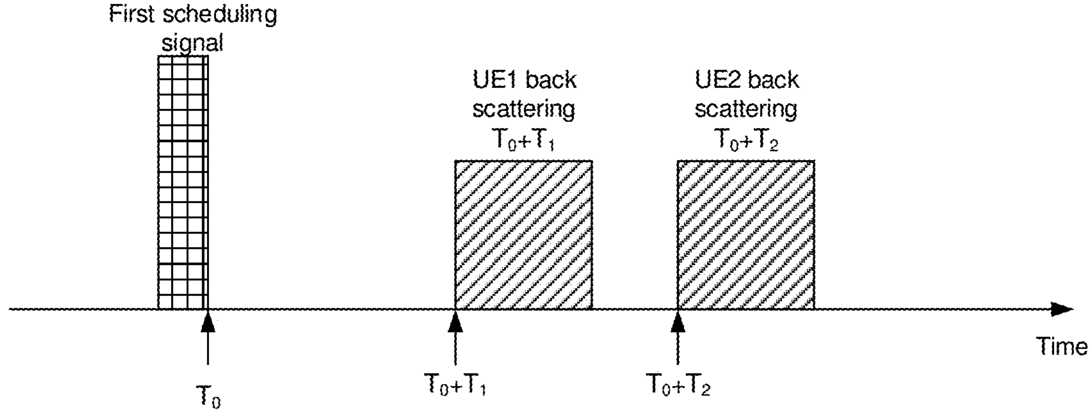
FIGS. 7A to 7C are schematic diagrams of a $T_0$, provided according to the embodiments of the present application.
Figure 7B:
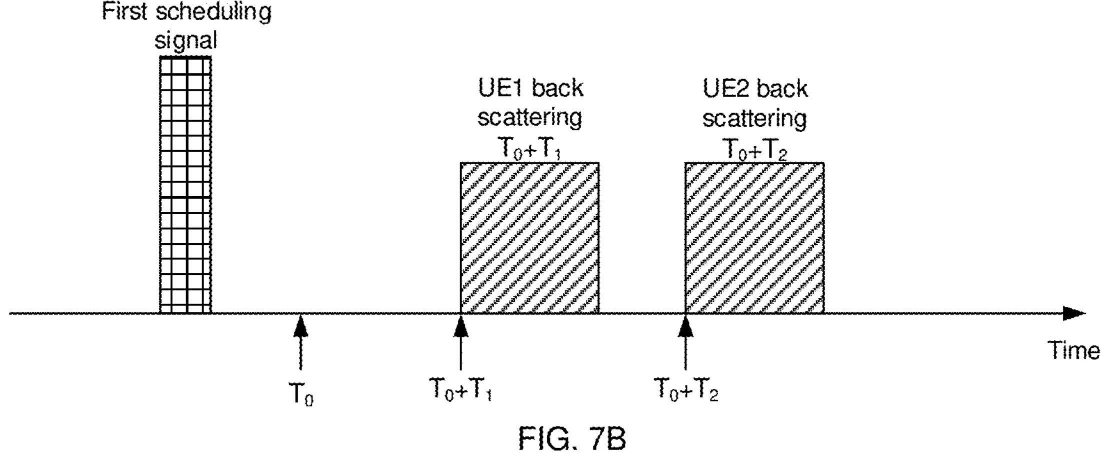
Figure 7C:
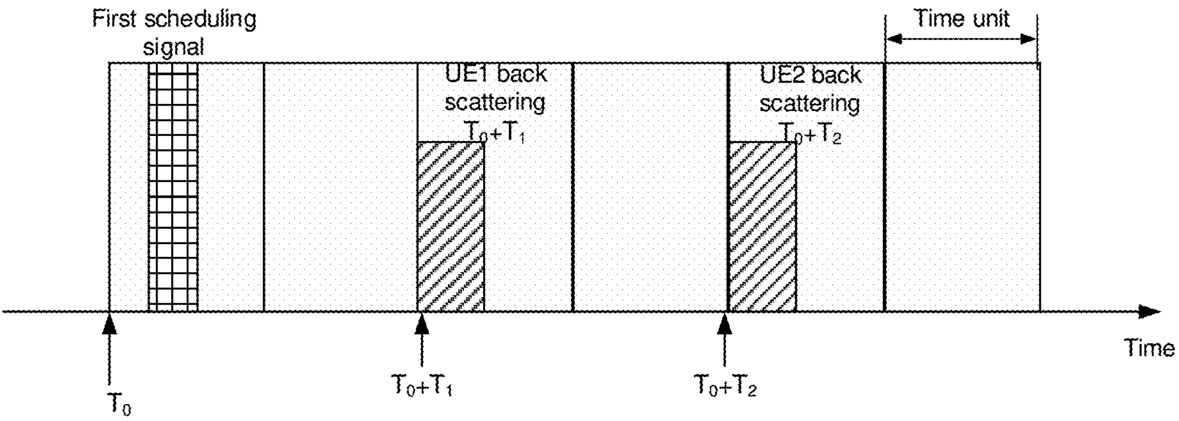

In some embodiments, for example, $T_0$ is not indicated by the first scheduling signal. As shown in FIG. 7A, $T_0$ is the moment at which a UE1 and a UE2 receive the first scheduling signal, the first duration corresponding to the UE1 is $T_1$, and the first duration corresponding to the UE2 is $T_2$, and then, the UE1 transmits a back scattering signal at a moment $T_0+T_1$, and the UE2 transmits a back scattering signal at a moment $T_0+T_2$. As shown in FIG. 7B, $T_0$ is a pre-configured moment or a moment agreed by the protocol, the UE1 and the UE2 know that $T_0$ is located at a moment $T_0$ after the first scheduling signal, the first duration corresponding to the UE1 is $T_1$, and the first duration corresponding to the UE2 is $T_2$, and then, the UE1 transmits a back scattering signal at a moment $T_0+T_1$, and the UE2 transmits a back scattering signal at a moment $T_0+T_2$. As shown in FIG. 7C, $T_0$ is the starting location of the time unit in which the first scheduling signal is located, the first duration corresponding to the UE1 is $T_1$, and the first duration corresponding to the UE2 is $T_2$, and then, the UE1 transmits a back scattering signal at a starting location of a time unit in which $T_0+T_1$ is located (particularly, the back scattering signal may be transmitted at the start location of the time unit, or the back scattering signal may be transmitted after an offset within the time unit), and the UE2 transmits a back scattering signal at a starting location of a time unit in which $T_0+T_2$ is located (particularly, the back scattering signal may be transmitted at the starting location of the time unit, or the back scattering signal may be transmitted after an offset within the time unit).

Figure 8A:
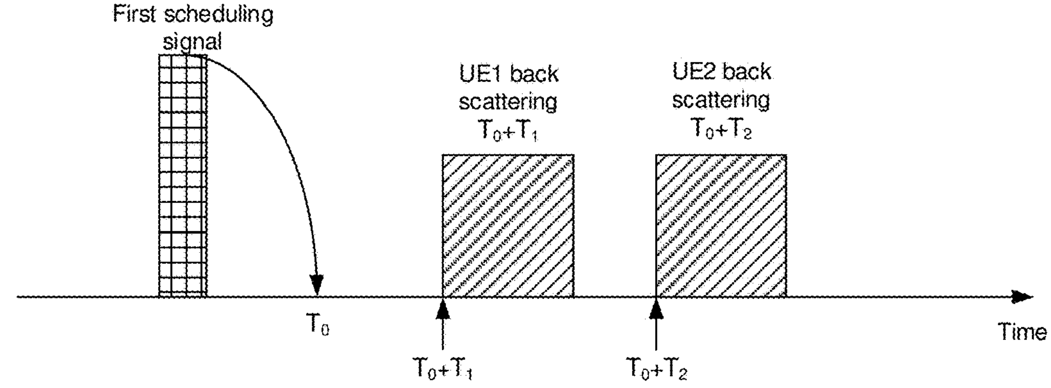
FIGS. 8A and 8B are schematic diagrams of another $T_0$, provided according to the embodiments of the present application.
Figure 8B:
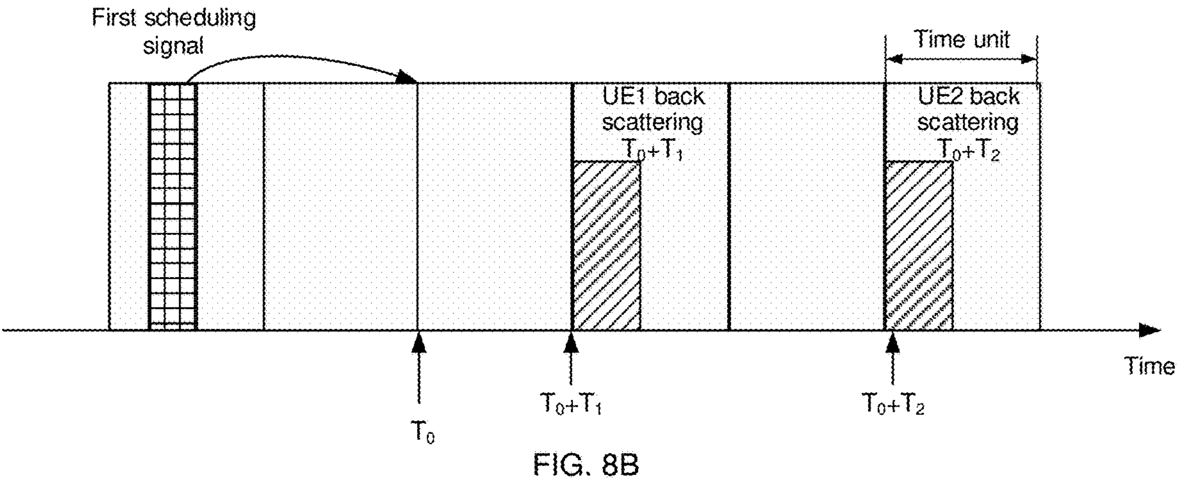

In some embodiments, for example, $T_0$ is indicated by the first scheduling signal. As shown in FIG. 8A, the first scheduling signal indicates $T_0$, the first duration corresponding to the UE1 is $T_1$, and the first duration corresponding to the UE2 is $T_2$, and then, the UE1 transmits a back scattering signal at a moment $T_0+T_1$, and the UE2 transmits a back scattering signal at a moment $T_0+T_2$. As shown in FIG. 8B, the first scheduling signal indicates a starting location of a time unit in which $T_0$ is located, the first duration corresponding to the UE1 is $T_1$, and the first duration corresponding to the UE2 is $T_2$, and then, the UE1 transmits a back scattering signal in a time unit in which $T_0+T_1$ is located (particularly, the back scattering signal may be transmitted at a starting location of the time unit, or the back scattering signal may be transmitted after an offset within the time unit), and the UE2 transmits a back scattering signal in a time unit in which $T_0+T_2$ is located (particularly, the back scattering signal may be transmitted at a starting location of the time unit, or the back scattering signal may be transmitted after an offset within the time unit).

Example 2: the time domain resource information for the back scattering communication includes the back scattering occasion for the back scattering communication. S210 described above may include: determining by the terminal device, the back scattering occasion for the back scattering communication from at least one available back scattering occasion according to the first information.

In some implementations of Example 2, the at least one available back scattering occasion is determined based on a time domain resource structure.

Figure 9:
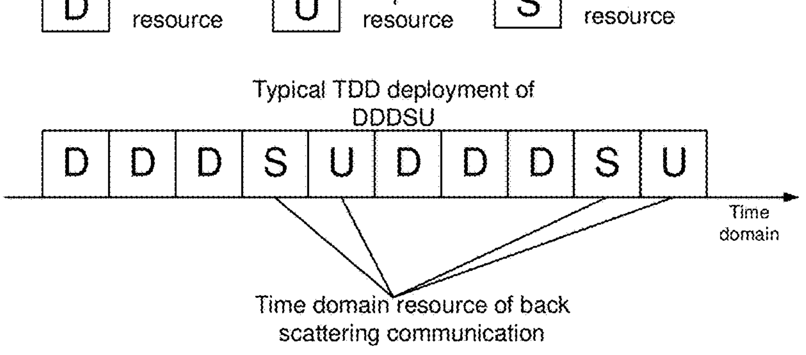
FIG. 9 is a schematic diagram of a time domain resource structure, provided according to the embodiments of the present application.

In some embodiments, the time domain resource structure may be as shown in FIG. 9, and in a time division duplexing (TDD) deployment, all uplink resources and/or flexible resources may be used as time domain resources for the back scattering communication.

In some implementations, the at least one available back scattering occasion is a part or all of time units in the time domain resource structure that are available for the back scattering. In some embodiments, for example, the time domain resource structure occupies one or more frames in the time domain, or the time domain resource structure occupies one or more subframes in the time domain, or the time domain resource structure occupies one or more slots in the time domain, or the time domain resource structure occupies one or more absolute time units (such as us, ms, s, etc.) in the time domain.

In some implementations, the time domain resource structure is indicated by the network device by the first scheduling signal for scheduling or triggering the back scattering communication, or the time domain resource structure is indicated by the network device by a signal other than the first scheduling signal, or the time domain resource structure is semi-statically configured by the network device, or the time domain resource structure is agreed by a protocol.

In some implementations, the time domain resource structure may also be indicated by the network device by a signal other than the first scheduling signal for scheduling or triggering the back scattering communication.

Figure 10A:
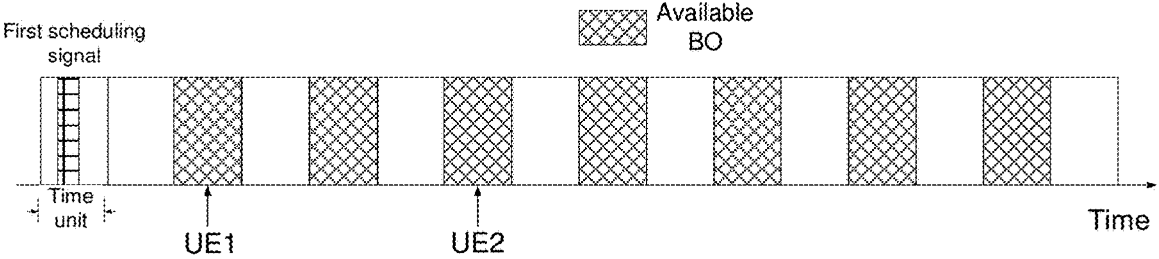
FIGS. 10A to 10C are schematic diagrams of back scattering, provided according to the embodiments of the present application.

In some embodiments, as shown in FIG. 10A, after receiving the first scheduling signal, a UE1 and a UE2 determine an available BO based on the time domain resource structure, and the UE1 determines the BO for the back scattering communication based on one of the above formula 1 to formula 3, and the UE2 determines the BO for the back scattering communication based on one of the above formula 1 to formula 3.

In some implementations of Example 2, the at least one available back scattering occasion is a part or all of back scattering occasions in a first time domain resource set.

In some implementations, the first time domain resource set is indicated by the network device by the first scheduling signal for scheduling or triggering the back scattering communication, or, the first time domain resource set is indicated by the network device by a signal other than the first scheduling signal, or, the first time domain resource set is semi-statically configured by the network device.

In some implementations, the first time domain resource set may also be indicated by the network device by a signal other than the first scheduling signal for scheduling or triggering the back scattering communication.

In some implementations, the terminal device determines the at least one available back scattering occasion according to a length of the first time domain resource set and a back scattering occasion location in the first time domain resource set.

Figure 10B:
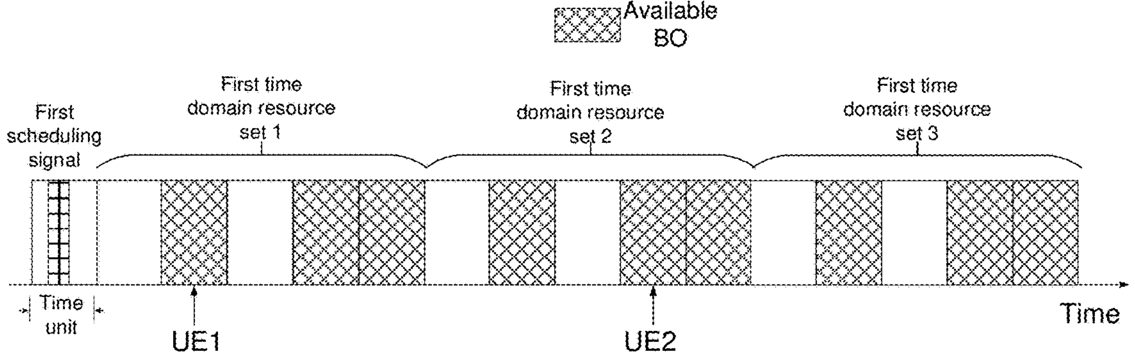

In some embodiments, as shown in FIG. 10B, the UE1 and the UE2 use a same BO pattern, and after the UE1 and the UE2 receive the first scheduling signal, the UE1 corresponds to a first time domain resource set 1, the UE2 corresponds to a first time domain resource set 2, and the UE1 determines the BO for the back scattering communication from the first time domain resource set 1 based on one of the above formula 1 to formula 3, and the UE2 determines the BO for the back scattering communication from the first time domain resource set 2 based on one of the above formula 1 to formula 3.

In some other implementations, in a case where the UE1 and the UE2 both correspond to the first time domain resource set 1, the UE1 may determine the BO for the back scattering communication from the first time domain resource set 1 based on one of the above formula 1 to formula 3, and the UE2 may determine the BO for the back scattering communication from the first time domain resource set 1 based on one of the above formula 1 to formula 3. The BOs determined by the UE1 and the UE2 for the back scattering communication are different.

In some implementations of Example 2, the at least one available back scattering occasion is a part or all of back scattering occasions in a first back scattering occasion pattern; where the first back scattering occasion pattern indicates a time domain location of a back scattering occasion that is available for the back scattering communication, in a first time domain resource set.

In some embodiments, for example, the first time domain resource set occupies one or more frames in the time domain, or the first time domain resource set occupies one or more subframes in the time domain, or the first time domain resource set occupies one or more slots in the time domain, or the first time domain resource set occupies one or more absolute time units (such as us, ms, s, etc.) in the time domain.

In some implementations, the first back scattering occasion pattern is indicated by the network device by the first scheduling signal for scheduling or triggering the back scattering communication, or the first back scattering occasion pattern is indicated by the network device by a signal other than the first scheduling signal for scheduling or triggering the back scattering communication, or the first back scattering occasion pattern is semi-statically configured by the network device.

In some implementations, the first back scattering occasion pattern is determined by the terminal device from a plurality of back scattering occasion patterns based on the identification information of the terminal device, or the first back scattering occasion pattern is determined by the terminal device from a plurality of back scattering occasion patterns based on the identification information of the terminal and the identification information of the serving cell, or the first back scattering occasion pattern is determined by the terminal device from a plurality of back scattering occasion patterns based on identification information of a terminal group to which the terminal device belongs, or the first back scattering occasion pattern is determined by the terminal device from a plurality of back scattering occasion patterns based on identification information of a terminal group to which the terminal device belongs and the identification information of the serving cell.

In some implementations, the terminal device determines the first back scattering occasion pattern from the plurality of back scattering occasion patterns according to the following formula:

$$(UE_{ID}\bmod N)+1,\text{ or }(UE_{ID}\vee Cell_{ID})\bmod N+1,\\\text{or }(UE_{ID}\wedge Cell_{ID})\bmod N+1;$$

where N is a number of the plurality of back scattering occasion patterns, $UE_{ID}$ denotes an identification of the first communication device, $Cell_{ID}$ denotes a serving cell identification, $\vee$ denotes an OR operation, $\wedge$ denotes an AND operation, and mod denotes a modulo operation.

In some implementations, the terminal device determines the first back scattering occasion pattern from the plurality of back scattering occasion patterns according to the following formula:

$$(UE_{groupID}\bmod N)+1,\text{ or }(UE_{groupID}\vee Cell_{ID})\bmod N+1,\\\text{or }(UE_{groupID}\wedge Cell_{ID})\bmod N+1;$$

where N is a number of the plurality of back scattering occasion patterns, $UE_{groupID}$ denotes an identification of the terminal group to which the first communication device belongs, $Cell_{ID}$ denotes a serving cell identification, $\vee$ denotes an OR operation, $\wedge$ denotes an AND operation, and mod denotes a modulo operation.

In some embodiments, for example, in a case where the number of the plurality of back scattering occasion patterns is N, the terminal device may determine the first back scattering occasion pattern from the plurality of back scattering occasion patterns based on one of the above formula 1 to formula 3. In addition, in a case where the terminal device determines the first back scattering occasion pattern from the plurality of back scattering occasion patterns based on the identification information of the terminal group to which the terminal device belongs, $UE_{ID}$ in the above formula 1 to formula 3 may be replaced by $UE_{groupID}$, thereby determining the first back scattering occasion pattern from the plurality of back scattering occasion patterns.

In some implementations, the plurality of back scattering occasion patterns are indicated by the network device by the first scheduling signals for scheduling or triggering the back scattering communication, or the plurality of back scattering occasion patterns are indicated by the network device by a signal other than the first scheduling signals, or the plurality of back scattering occasion patterns are pre-configured, or the plurality of back scattering occasion patterns are agreed by a protocol, or the plurality of back scattering occasion patterns are semi-statically configured by the network device.

In some implementations, in a time domain, the plurality of back scattering occasion patterns do not overlap with each other, or the plurality of back scattering occasion patterns partially overlap with each other.

Figure 10C:
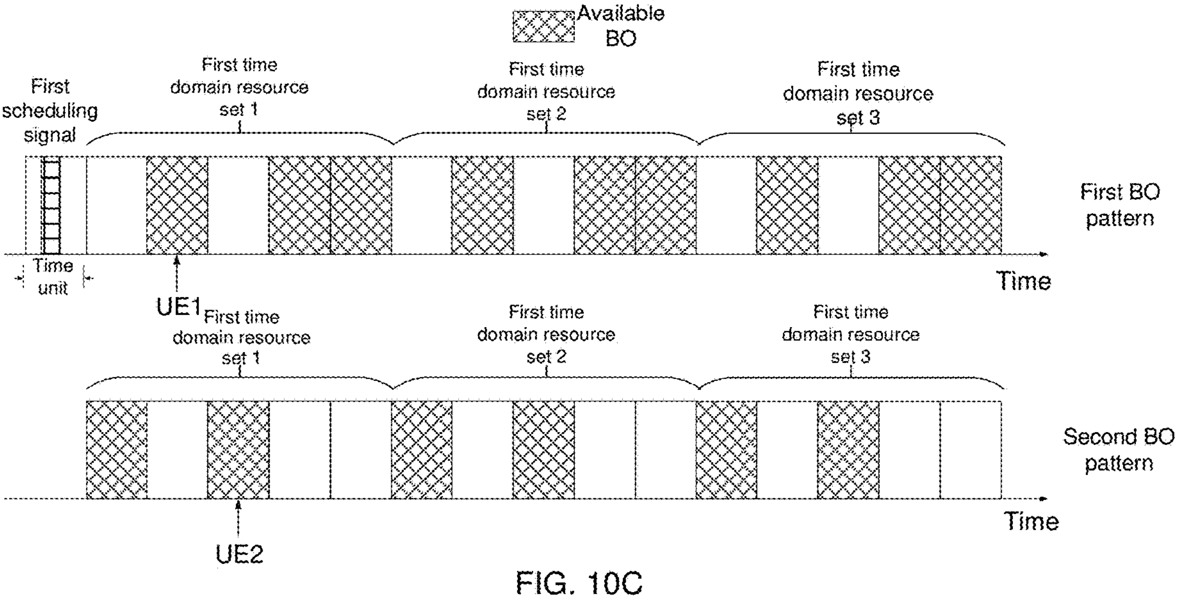

In some embodiments, as shown in FIG. 10C, after the UE1 and the UE2 receive the first scheduling signal, the UE1 corresponds to a first BO pattern and the UE2 corresponds to a second BO pattern. Herein, a second time unit, a fourth time unit and a fifth time unit in a first time domain resource set 1 are indicated by the first BO pattern, and locations of time units indicated by the first BO pattern in other first time domain resource sets are consistent with those in the first time domain resource set 1; a first time unit and a third time unit in a first time domain resource set 1 are indicated by a second BO pattern, and locations of time units indicated by the second BO pattern in other first time domain resource sets are consistent with those in the first time domain resource set 1. The UE1 determines the BO for the back scattering communication from the first BO pattern based on one of the above formula 1 to formula 3, and the UE2 determines the BO for the back scattering communication from the second BO pattern based on one of the above formula 1 to formula 3.

Figure 11:
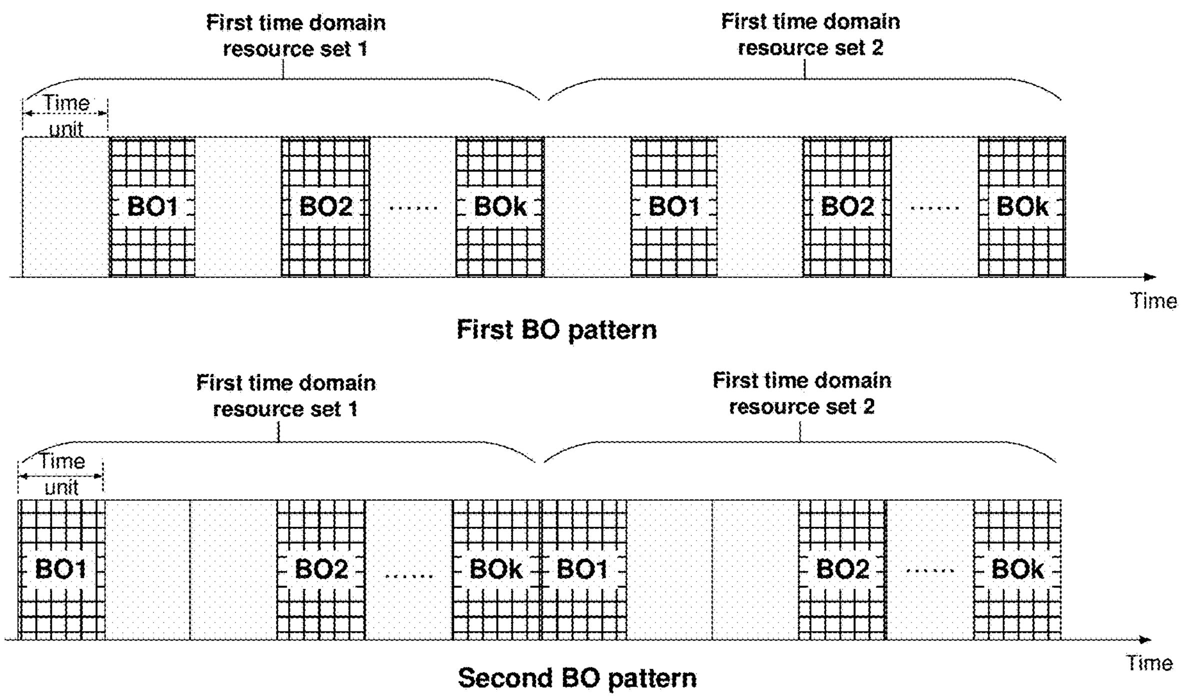
FIG. 11 is a schematic diagram of a BO pattern, provided according to the embodiments of the present application.

In some implementations, as shown in FIG. 11, a BO1 in the first BO pattern occupies a second time unit in the first time domain resource set 1, a BO2 in the first BO pattern occupies a fourth time unit in the first time domain resource set 1, . . . , a BOK in the first BO pattern occupies a n-th time unit in the first time domain resource set 1, and locations of time units occupied by the first BO pattern in other first time domain resource sets are consistent with those in the first time domain resource set 1; a BO1 of the second BO pattern occupies a first time unit in the first time domain resource set 1, a BO2 of the second BO pattern occupies a fourth time unit in the first time domain resource set 1, . . . , a BOK of the second BO pattern occupies a n-th time unit in the first time domain resource set 1, and locations of time units occupied by the second BO pattern in other first time domain resource sets are consistent with those in the first time domain resource set 1. In some embodiments, for example, the first time domain resource set may be understood as 1 frame, and the first BO pattern may be understood as a frame structure, and therefore, the first BO pattern may be regarded as a configuration of a frame structure, the first time domain resource set 1 denotes frame x, and the first time domain resource set 2 denotes frame x+1, and the same frame structure configuration is used in continuous frames. That is, the first BO pattern is a BO mapping for the first time domain resource set, and for example, each first time domain resource set uses BOs determined by the first BO pattern in the time domain.

In some embodiments, the network device may determine the identification information of the terminal device according to a time unit of transmitting the first scheduling signal and a time unit of receiving the back scattering signal; and the network device descrambles the back scattering signal according to the identification information of the terminal device.

Since the back scattering signal is obtained by scrambling the identification information of the terminal device, the network device descrambles the back scattering signal according to the identification information of the terminal device. In some embodiments, for example, the network device receives the back scattering signal 1, and at this time, the network device descrambles the back scattering signal 1 based on the UE ID of the UE1 and the descrambling is successful; and the network device descrambles the back scattering signal 1 based on the UE ID of the UE2 and the descrambling is unsuccessful, then the network device may judge that the terminal device transmitting the back scattering signal 1 is the UE1.

In some embodiments, the network device may determine the first duration according to a time unit for transmitting the first scheduling signal and a time unit for receiving the back scattering signal, and determine an identification of the terminal device based on the following formula 7 or formula 8.

$$\text{Index of the first duration } T = (UE_{ID} \bmod N) + 1 \qquad \text{formula 7}$$

where $UE_{ID}$ denotes the identification of the terminal device, N denotes a number of the first duration configured, and mod denotes a modulo operation.

$$\text{Index of the first duration } T = (UE_{ID} \vee Cell_{ID}) \bmod T_{max} \qquad \text{formula 8}$$

where $UE_{ID}$ denotes the identification of the terminal device, $Cell_{ID}$ denotes a serving cell identification, $\vee$ denotes an OR operation, $T_{max}$ denotes a maximum value of the first duration, and mod denotes a modulo operation.

In some implementations, the "OR operation" in the above formula 8 may also be replaced by an "AND operation" or an "XOR operation" or an "XNOR operation".

In some embodiments, if there are a plurality of UE IDs, the network device may check the solving of the back scattering communication based on the plurality of UE IDs. In some embodiments, for example, the network device receives a back scattering signal 1 and a back scattering signal 2. At this time, the network device descrambles the back scattering signal 1 based on the UE IDs of the UE1 and the UE2 respectively, and the descrambling of the UE ID of the UE1 is successful; the network device descrambles the back scattering signal 2 based on the UE IDs of the UE1 and the UE2 respectively, and the descrambling of the UE ID of the UE2 is successful. Then, the network device may judge that the terminal device transmitting the back scattering signal 1 is the UE1 and the terminal device transmitting the back scattering signal 2 is the UE2.

In some embodiments, the network device determines whether to proceed to the next scheduling according to whether the back scattering signal is correctly solved.

Therefore, in the embodiments of the present application, the first communication device may determine time domain resource information for the back scattering communication according to identification information of the first communication device, or the first communication device may determine the time domain resource information for the back scattering communication according to the identification information of the first communication device and identification information of the serving cell. Therefore, the first communication device may have its own time domain resources for the back scattering communication, and different terminals transmit back scattering signals in the time-division manner, which can avoid the conflict between different terminals during the back scattering communication, and reduce the probability of the collision. In addition, the second communication device may determine a possible UE ID based on a relationship between the back scattering signal and the first scheduling signal in the time domain, and further perform a reception process of the back scattering signal based on the determined UE ID.

The embodiments of the first communication device side of the present application are described in detail above with reference to FIG. 6 to FIG. 11, and embodiments of the second communication device side of the present application are described in detail below with reference to FIG. 12, and it should be understood that the embodiments of the second communication device side and the embodiments of the first communication device side correspond to each other, and the similar description may refer to the embodiments of the first communication device side.

Figure 12:
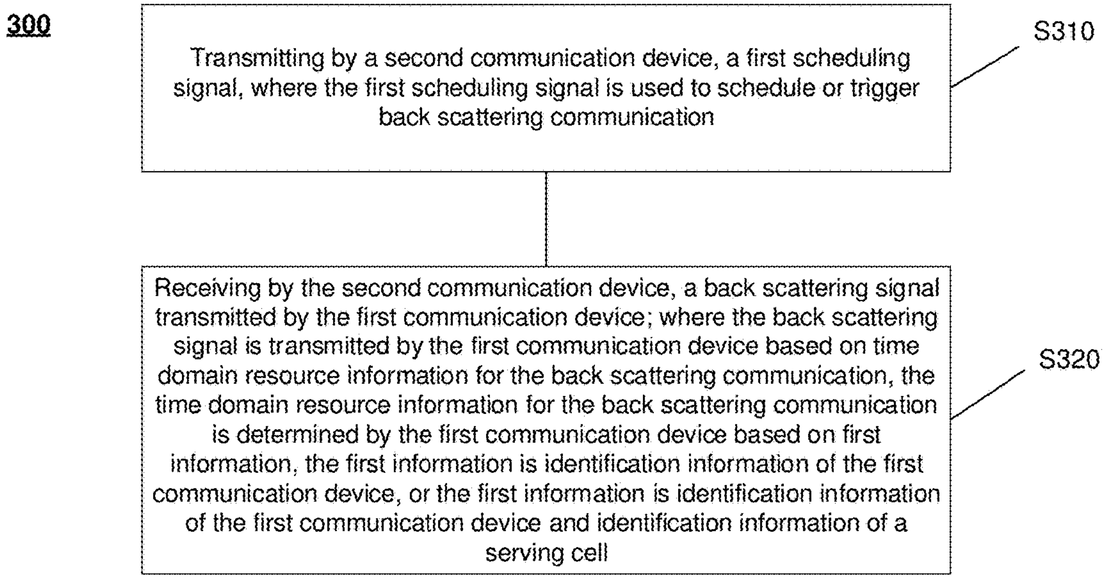
FIG. 12 is a schematic flow chart of another method of back scattering communication, provided according to the embodiments of the present application.

FIG. 12 is a schematic flow chart of a method 300 of back scattering communication, according to the embodiments of the present application, and as shown in FIG. 12, the method 300 of back scattering communication may include at least some of the following contents:

S310, transmitting by a second communication device, a first scheduling signal, where the first scheduling signal is used to schedule or trigger the back scattering communication;

S320, receiving by the second communication device, a back scattering signal transmitted by a first communication device; where the back scattering signal is transmitted by the first communication device based on time domain resource information for the back scattering communication, the time domain resource information for the back scattering communication is determined by the first communication device based on first information, the first information is identification information of the first communication device, or the first information is identification information of the first communication device and identification information of a serving cell.

In the embodiments of the present application, the back scattering communication may be communication between the first communication device and a second communication device. For example, the first communication device is a terminal device, and the second communication device is a network device, that is, the communication between the first communication device and the second communication device may be uplink and downlink communication. For another example, the first communication device is a terminal device, and the second communication device is another terminal device, that is, the communication between the first communication device and the second communication device may be sidelink communication.

In the following, the first communication device is taken as a terminal device and the second communication device is taken as a network device as an example to explain.

In some embodiments, the identification information of the terminal device may be a terminal identification (UE ID), or other information used to identify the terminal device, such as a terminal index, etc., which is not limited by the present application.

In some embodiments, the identification information of the serving cell may be a cell identification (Identity, ID), or other information used to identify the serving cell, such as a cell index, etc., which is not limited by the present application.

The embodiments of the present application may be applied to a cellular Internet of Things system, such as a cellular passive Internet of Things system, or may also be applied to other scenarios in which the terminal device transmits information to the network device in a zero-power consumption communication manner or a battery-free communication manner, but the present application is not limited thereto.

The embodiments of the present application may be applicable to one-to-many communication modes such as broadcast, multicast, and packet paging, etc. In some embodiments, for example, when the network device transmits a broadcast message, a multicast message, a packet paging message, etc., there may be a plurality of zero-power consumption devices responding, and at this time, an anti-collision mechanism needs to be designed for the zero-power consumption communication, to reduce the collision between the zero-power consumption devices. In the embodiments of the present application, back scattering signals are transmitted by different terminals in a time-division manner, which can avoid the conflict between different terminals during the back scattering communication. Of course, the embodiments of the present application are also applicable to one-to-one communication modes, which is not limited by the present application.

In some embodiments, the terminal device may be a zero-power consumption terminal; for example, the terminal device obtains energy by energy harvesting, to be used for communication, information collecting and processing.

In some embodiments, the terminal device may also be other terminals, such as a terminal that may achieve communication, information collecting and processing without the energy harvesting. The present application is not limited thereto.

In the cellular network, due to no battery to supply energy, the zero-power consumption device needs to obtain energy for communication by performing the energy harvesting on radio frequency signals (or other environmental signals), and then perform the corresponding communication procedure based on the back scattering. Typically, a signal for the energy harvesting (i.e., an energy supply signal) may be provided by the network device or a dedicated energy node. When the communication is performed based on scheduling, the network device needs to provide control information to schedule the information transmission, which may be referred to as a scheduling signal/trigger signal. The trigger signal and the energy supply signal may be a same signal or two independent signals. When the communication is performed by the zero-power consumption device, a carrier capable of carrying the communication is needed, and the carrier may be a signal independent from the energy supply signal and the trigger signal, or may be one signal with the energy supply signal, or one signal with the trigger signal.

In the embodiments of the present application, frequency bands of the energy supply signal, the carrier signal, and the trigger signal may be completely different, completely the same, or partially the same. The network device continuously or intermittently transmits the energy supply signal in a certain frequency band, the zero-power consumption device harvests energy, and after obtaining the energy, the zero-power consumption device may perform the corresponding communication procedure, such as measuring, receiving a channel/signal, transmitting a channel/signal, etc.

In some embodiments, the network device may determine the identification information of the terminal device according to a time unit of transmitting the first scheduling signal and a time unit of receiving the back scattering signal; and the network device descrambles the back scattering signal according to the identification information of the terminal device.

Since the back scattering signal is obtained by scrambling the identification information of the terminal device, the network device descrambles the back scattering signal according to the identification information of the terminal device. In some embodiments, for example, the network device receives the back scattering signal 1, and at this time, the network device descrambles the back scattering signal 1 based on the UE ID of the UE1 and the descrambling is successful; and the network device descrambles the back scattering signal 1 based on the UE ID of the UE2 and the descrambling is unsuccessful, and then, the network device may judge that the terminal device transmitting the back scattering signal 1 is the UE1.

In some embodiments, the network device may determine a first duration according to the time unit for transmitting the first scheduling signal and the time unit for receiving the back scattering signal, and determine an identification of the terminal device based on the above formula 7 or formula 8.

In some embodiments, if there are a plurality of UE IDs, the network device may check the solving of the back scattering communication based on the plurality of UE IDs. In some embodiments, for example, the network device receives a back scattering signal 1 and a back scattering signal 2. At this time, the network device descrambles the back scattering signal 1 based on the UE IDs of the UE1 and the UE2 respectively, and the descrambling of the UE ID of the UE1 is successful; the network device descrambles the back scattering signal 2 based on the UE IDs of the UE1 and the UE2 respectively, and the descrambling of the UE ID of the UE2 is successful. Then, the network device may judge that the terminal device transmitting the back scattering signal 1 is the UE1 and the terminal device transmitting the back scattering signal 2 is the UE2.

In some embodiments, the network device determines whether to proceed to the next scheduling according to whether the back scattering signal is correctly solved.

In some embodiments, the time domain resource information for the back scattering communication includes at least one of: a starting location of a time domain resource for the back scattering communication, or a back scattering occasion for the back scattering communication.

In some embodiments, the time domain resource information for the back scattering communication includes a starting location of a time domain resource for the back scattering communication; where the starting location of the time domain resource for the back scattering communication is determined by the terminal device based on a first duration and a first time domain location, and the first duration is determined by the terminal device from N durations based on the first information, and N is a positive integer.

In some embodiments, the first duration is determined by the terminal device from the N durations according to the following formula:

$$(UE_{ID} \bmod N)+1, \text{ or } (UE_{ID} \vee Cell_{ID}) \bmod N+1, \text{ or } (UE_{ID} \wedge Cell_{ID}) \bmod N+1;$$

where $UE_{ID}$ denotes an identifier of the terminal device, $Cell_{ID}$ denotes a serving cell identification, $\vee$ denotes an OR operation, $\wedge$ denotes an AND operation, and mod denotes a modulo operation.

In some embodiments, the first duration is determined by the terminal device from the N durations according to the following formula:

$$(UE_{ID} \vee Cell_{ID}) \bmod T_{max}, \text{ or, } UE_{ID} \bmod T_{max};$$

where $UE_{ID}$ denotes an identification of the terminal device, $Cell_{ID}$ denotes a serving cell identification, $\vee$ denotes an OR operation, $T_{max}$ denotes a maximum value of the first duration, and mod denotes a modulo operation.

In some embodiments, the $T_{max}$ is pre-configured, or the $T_{max}$ is configured by the network device, or the $T_{max}$ is semi-statically configured, or the $T_{max}$ is configured by the network device by the first scheduling signal.

In some embodiments, the N durations are pre-configured, or the N durations are configured by the network device, or the N durations are semi-statically configured, or the N durations are configured by the network device by the first scheduling signal.

In some embodiments, the starting location of the time domain resource for the back scattering communication is determined by the terminal device according to the following formula:

$$T_{start} = T_0 + T;$$

where $T_{start}$ denotes the starting location of the time domain resource for the back scattering communication, $T_0$ denotes the first time domain location, and T denotes the first duration.

In some embodiments, the first time domain location is determined based on the first scheduling signal.

In some embodiments, the first time domain location is a moment at which the terminal device receives the first scheduling signal, or the first time domain location is a starting time domain location at which the terminal device receives the first scheduling signal, or the first time domain location is an ending time domain location at which the terminal device receives the first scheduling signal, or the first time domain location is a time unit in which the first scheduling signal is located, or the first time domain location is a time unit in which a starting time domain location of the first scheduling signal is located, or the first time domain location is a time unit in which an ending time domain location of the first scheduling signal is located, or the first time domain location is indicated by the first scheduling signal.

In some embodiments, the first time domain location is pre-configured, or the first time domain location is agreed by a protocol, or the first time domain location is indicated by the network device by a signal other than the first scheduling signal.

In some embodiments, the time domain resource information for the back scattering communication includes a back scattering occasion for the back scattering communication;

where the back scattering occasion for the back scattering communication is determined by the terminal device from at least one available back scattering occasion based on the first information.

In some embodiments, the at least one available back scattering occasion is determined based on a time domain resource structure.

In some embodiments, the at least one available back scattering occasion is a part or all of time units in the time domain resource structure that are available for back scattering.

In some embodiments, the time domain resource structure is indicated by the network device by the first scheduling signal, or the time domain resource structure is indicated by the network device by a signal other than the first scheduling signal, or the time domain resource structure is semi-statically configured by the network device, or the time domain resource structure is agreed by a protocol.

In some embodiments, the at least one available back scattering occasion is a part or all of back scattering occasions in a first time domain resource set.

In some embodiments, the first time domain resource set is indicated by the network device by the first scheduling signal, or, the first time domain resource set is indicated by the network device by a signal other than the first scheduling signal, or, the first time domain resource set is semi-statically configured by the network device.

In some embodiments, the at least one available back scattering occasion is determined by the terminal device based on a length of the first time domain resource set and a back scattering occasion location in the first time domain resource set.

In some embodiments, the at least one available back scattering occasion is a part or all of back scattering occasions in a first back scattering occasion pattern; where the first back scattering occasion pattern indicates a time domain location of a back scattering occasion that is available for the back scattering communication, in a first time domain resource set.

In some embodiments, the first back scattering occasion pattern is indicated by the network device by the first scheduling signal, or the first back scattering occasion pattern is indicated by the network device by a signal other than the first scheduling signal, or the first back scattering occasion pattern is semi-statically configured by the network device.

In some embodiments, the first back scattering occasion pattern is determined by the terminal device from a plurality of back scattering occasion patterns based on the identification information of the terminal device, or the first back scattering occasion pattern is determined by the terminal device from a plurality of back scattering occasion patterns based on the identification information of the terminal device and the identification information of the serving cell, or the first back scattering occasion pattern is determined by the terminal device from a plurality of back scattering occasion patterns based on identification information of a terminal group to which the terminal device belongs, or the first back scattering occasion pattern is determined by the terminal device from a plurality of back scattering occasion patterns based on identification information of a terminal group to which the terminal device belongs and the identification information of the serving cell.

In some embodiments, the first back scattering occasion pattern is determined by the terminal device from the plurality of back scattering occasion patterns based on the following formula:

$$(UE_{ID} \bmod N)+1,\ \text{or}\ (UE_{ID} \vee Cell_{ID}) \bmod N+1,$$

$$\text{or}\ (UE_{ID} \wedge Cell_{ID}) \bmod N+1;$$

where N is a number of the plurality of back scattering occasion patterns, $UE_{ID}$ denotes an identification of the terminal device, $Cell_{ID}$ denotes a serving cell identification, $\vee$ denotes an OR operation, $\wedge$ denotes an AND operation, and mod denotes a modulo operation.

In some embodiments, the first back scattering occasion pattern is determined by the terminal device from the plurality of back scattering occasion patterns based on the following formula:

$$(UE_{groupID} \bmod N)+1,\ \text{or}\ (UE_{groupID} \vee Cell_{ID}) \bmod N+1,$$

$$\text{or}\ (UE_{groupID} \wedge Cell_{ID}) \bmod N+1;$$

where N is a number of the plurality of back scattering occasion patterns, $UE_{groupID}$ denotes an identification of the terminal group to which the terminal device belongs, $Cell_{ID}$ denotes a serving cell identification, $\vee$ denotes an OR operation, $\wedge$ denotes an AND operation, and mod denotes a modulo operation.

In some embodiments, the plurality of back scattering occasion patterns are indicated by the network device by the first scheduling signal, or the plurality of back scattering occasion patterns are indicated by the network device by a signal other than the first scheduling signal, or the plurality of back scattering occasion patterns are pre-configured, or the plurality of back scattering occasion patterns are agreed by a protocol, or the plurality of back scattering occasion patterns are semi-statically configured by the network device.

In some embodiments, in a time domain, the plurality of back scattering occasion patterns do not overlap with each other, or the plurality of back scattering occasion patterns partially overlap with each other.

In some embodiments, the back scattering signal is obtained by scrambling the identification information of the terminal device.

In some embodiments, the terminal device obtains energy by the energy harvesting, to be used for communication, information collecting and processing.

In some embodiments, the first scheduling signal is an energy supply signal of the terminal device.

In some embodiments, the network device transmits the energy supply signal of the terminal device to the terminal device.

In some embodiments, if there are a plurality of UE IDs, the network device may check the solving of the back scattering communication based on the plurality of UE IDs.

In some embodiments, the network device determines whether to proceed to the next scheduling based on whether the back scattering signal is correctly solved.

Therefore, in the embodiments of the present application, the first communication device may determine time domain resource information for the back scattering communication according to identification information of the first communication device, or the first communication device may determine the time domain resource information for the back scattering communication according to the identification information of the first communication device and identification information of the serving cell. Therefore, the first communication device may have its own time domain resources for the back scattering communication, and different terminals transmit back scattering signals in the time-division manner, which can avoid the conflict between different terminals during the back scattering communication, and reduce the probability of the collision. In addition, the second communication device may determine a possible UE ID based on a relationship between the back scattering signal and the first scheduling signal in the time domain, and further perform a reception process of the back scattering signal based on the determined UE ID.

The method embodiments of the present application are described in detail above with reference to FIG. 6 to FIG. 12, and apparatus embodiments of the present application are described in detail below with reference to FIG. 13 to FIG. 14, and it should be understood that the apparatus embodiments and the method embodiments correspond to each other and the similar description may refer to the method embodiments.

Figure 13:
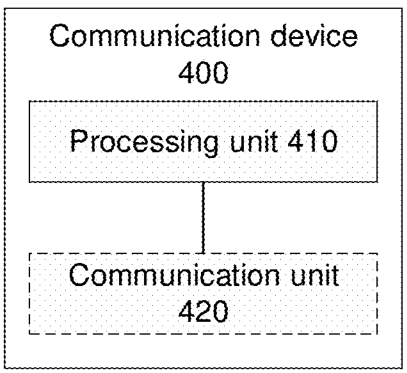
FIG. 13 is a schematic block diagram of a communication device, provided according to the embodiments of the present application.

FIG. 13 shows a schematic block diagram of a communication device 400, according to the embodiments of the present application. As shown in FIG. 13, the communication device 400 is a first communication device, and the communication device 400 includes:

a processing unit 410, configured to determine time domain resource information for the back scattering communication according to first information;

where the first information is identification information of the first communication device, or the first information is identification information of the first communication device and identification information of a serving cell.

In some embodiments, the time domain resource information for the back scattering communication includes at least one of: a starting location of a time domain resource for the back scattering communication, or a back scattering occasion for the back scattering communication.

In some embodiments, the time domain resource information for the back scattering communication includes a starting location of a time domain resource for the back scattering communication;

the processing unit 410 is configured to:

determine a first duration according to the first information; and determine the starting location of the time domain resource for the back scattering communication according to the first duration and a first time domain location.

In some embodiments, the processing unit 410 is configured to determine the starting location of the time domain resource for the back scattering communication according to the following formula:

$$T_{start} = T_0 + T;$$

where $T_{start}$ denotes the starting location of the time domain resource for the back scattering communication, $T_0$ denotes the first time domain location, and T denotes the first duration.

In some embodiments, the first time domain location is determined based on a first scheduling signal for scheduling or triggering the back scattering communication.

In some embodiments, the first time domain location is a moment at which the first communication device receives the first scheduling signal, or the first time domain location is a starting time domain location at which the first communication device receives the first scheduling signal, or the first time domain location is an ending time domain location at which the first communication device receives the first scheduling signal, or the first time domain location is a time unit in which the first scheduling signal is located, or the first time domain location is a time unit in which a starting time domain location of the first scheduling signal is located, or the first time domain location is a time unit in which an ending time domain location of the first scheduling signal is located, or the first time domain location is indicated by the first scheduling signal.

In some embodiments, the first time domain location is pre-configured, or the first time domain location is agreed by a protocol, or the first time domain location is indicated by a second communication device by a signal other than the first scheduling signal.

In some embodiments, the processing unit 410 is configured to:

determine the first duration from N durations according to the following formula, where N is a positive integer:

$$UE_{ID} \bmod N) + 1, \text{ or } (UE_{ID} \vee \mathrm{Cell}_{ID}) \bmod N + 1,$$
$$\text{or } (UE_{ID} \wedge \mathrm{Cell}_{ID}) \bmod N + 1;$$

where $UE_{ID}$ denotes an identification of the first communication device, $Cell_{ID}$ denotes a serving cell identification, $\vee$ denotes an OR operation, $\wedge$ denotes an AND operation, and mod denotes a modulo operation.

In some embodiments, the processing unit 410 is configured to:

determine the first duration from N durations according to the following formula, where N is a positive integer:

$$(UE_{ID} \vee \mathrm{Cell}_{ID}) \bmod T_{max}, \text{ or, } UE_{ID} \bmod T_{max};$$

where $UE_{ID}$ denotes an identification of the first communication device, $Cell_{ID}$ denotes a serving cell identification, $\vee$ denotes an OR operation, $T_{max}$ denotes a maximum value of the first duration, and mod denotes a modulo operation.

In some embodiments, the $T_{max}$ is pre-configured, or the $T_{max}$ is configured by a second communication device, or the $T_{max}$ is semi-statically configured, or the $T_{max}$ is configured by a second communication device by a first scheduling signal for scheduling or triggering the back scattering communication, or the $T_{max}$ is configured by a second communication device by a signal other than a first scheduling signal for scheduling or triggering the back scattering communication.

In some embodiments, the N durations are pre-configured, or the N durations are configured by a second communication device, or the N durations are semi-statically configured, or the N durations are configured by a second communication device by a first scheduling signal for scheduling or triggering the back scattering communication, or the N durations are configured by a second communication device by a signal other than a first scheduling signal for scheduling or triggering the back scattering communication.

In some embodiments, the time domain resource information for the back scattering communication includes a back scattering occasion for the back scattering communication;

the processing unit 410 is configured to:

determine the back scattering occasion for the back scattering communication from at least one available back scattering occasion according to the first information.

In some embodiments, the at least one available back scattering occasion is determined based on a time domain resource structure.

In some embodiments, the at least one available back scattering occasion is a part or all of time units in the time domain resource structure that are available for back scattering.

In some embodiments, the time domain resource structure is indicated by a second communication device by a first scheduling signal for scheduling or triggering the back scattering communication, or the time domain resource structure is indicated by a second communication device by a signal other than a first scheduling signal for scheduling or triggering the back scattering communication, or the time domain resource structure is semi-statically configured by a second communication device, or the time domain resource structure is agreed by a protocol.

In some embodiments, the at least one available back scattering occasion is a part or all of back scattering occasions in a first time domain resource set.

In some embodiments, the first time domain resource set is indicated by a second communication device by a first scheduling signal for scheduling or triggering the back scattering communication, or the first time domain resource set is indicated by a second communication device by a signal other than a first scheduling signal for scheduling or triggering the back scattering communication, or the first time domain resource set is semi-statically configured by a second communication device.

In some embodiments, the processing unit 410 is further configured to determine the at least one available back scattering occasion according to a length of the first time domain resource set and a back scattering occasion location in the first time domain resource set.

In some embodiments, the at least one available back scattering occasion is a part or all of back scattering occasions in a first back scattering occasion pattern;

where the first back scattering occasion pattern indicates a time domain location of a back scattering occasion that is available for the back scattering communication, in a first time domain resource set.

In some embodiments, the first back scattering occasion pattern is indicated by the second communication device by the first scheduling signal for scheduling or triggering the back scattering communication, or the first back scattering occasion pattern is indicated by the second communication device by a signal other than the first scheduling signal for scheduling or triggering the back scattering communication, or the first back scattering occasion pattern is semi-statically configured by the second communication device.

In some embodiments, the first back scattering occasion pattern is determined by the first communication device from a plurality of back scattering occasion patterns based on the identification information of the first communication device, or the first back scattering occasion pattern is determined by the first communication device from a plurality of back scattering occasion patterns based on the identification information of the first communication device and the identification information of the serving cell, or the first back scattering occasion pattern is determined by the first communication device from a plurality of back scattering occasion patterns based on identification information of a terminal group to which the first communication device belongs, or the first back scattering occasion pattern is determined by the first communication device from a plurality of back scattering occasion patterns based on identification information of a terminal group to which the first communication device belongs and the identification information of the serving cell.

In some embodiments, the processing unit 410 is further configured to determine the first back scattering occasion pattern from the plurality of back scattering occasion patterns according to the following formula:

$$(UE_{ID} \bmod N)+1, \text{ or } (UE_{ID} \vee \mathrm{Cell}_{ID}) \bmod N+1, \text{ or } (UE_{ID} \wedge \mathrm{Cell}_{ID}) \bmod N+1;$$

where N is a number of the plurality of back scattering occasion patterns, $UE_{ID}$ denotes an identification of the first communication device, $\mathrm{Cell}_{ID}$ denotes a serving cell identification, $\vee$ denotes an OR operation, $\wedge$ denotes an AND operation, and mod denotes a modulo operation.

In some embodiments, the processing unit 410 is further configured to determine the first back scattering occasion pattern from the plurality of back scattering occasion patterns according to the following formula:

$$(UE_{groupID} \bmod N)+1, \text{ or } (UE_{groupID} \vee \mathrm{Cell}_{ID}) \bmod N+1, \text{ or } (UE_{groupID} \wedge \mathrm{Cell}_{ID}) \bmod N+1;$$

where N is a number of the plurality of back scattering occasion patterns, $UE_{groupID}$ denotes an identification of the terminal group to which the first communication device belongs, $\mathrm{Cell}_{ID}$ denotes a serving cell identification, $\vee$ denotes an OR operation, $\wedge$ denotes an AND operation, and mod denotes a modulo operation.

In some embodiments, the plurality of back scattering occasion patterns are indicated by a second communication device by a first scheduling signal for scheduling or triggering the back scattering communication, or the plurality of back scattering occasion patterns are indicated by a second communication device by a signal other than a first scheduling signal for scheduling or triggering the back scattering communication, or the plurality of back scattering occasion patterns are pre-configured, or the plurality of back scattering occasion patterns are agreed by a protocol, or the plurality of back scattering occasion patterns are semi-statically configured by a second communication device.

In some embodiments, in a time domain, the plurality of back scattering occasion patterns do not overlap with each other, or the plurality of back scattering occasion patterns partially overlap with each other.

In some embodiments, the first communication device 400 further includes: a communication unit 420;

the communication unit 420 is further configured to transmit a back scattering signal according to a determined time domain resource for the back scattering communication.

In some embodiments, the back scattering signal is obtained by scrambling the identification information of the first communication device.

In some embodiments, the first communication device obtains energy by energy harvesting, to be used for communication, information collecting and processing.

In some embodiments, the first communication device 400 further includes: the communication unit 420;

in a case where a first scheduling signal for scheduling or triggering the back scattering communication is an energy supply signal of the first communication device, the communication unit 420 is further configured to monitor the first scheduling signal during the energy harvesting.

In some embodiments, in a case where an energy supply signal of the first communication device does not include scheduling information, the communication unit 420 is further configured to monitor a first scheduling signal for scheduling or triggering the back scattering communication, after the energy harvesting.

In some embodiments, the above communication unit may be a communication interface or a transceiver, or an input and output interface of a communication chip or a system-on-chip. The above processing unit may be one or more processors.

It should be understood that the communication device 400 according to the embodiments of the present application may correspond to the first communication device in the method embodiments of the present application, and the above and other operations and/or functions of various units in the communication device 400 are respectively to implement the corresponding procedure of the first communication device in the method 200 shown in FIG. 6, which will not be repeated here for the sake of brevity.

Figure 14:
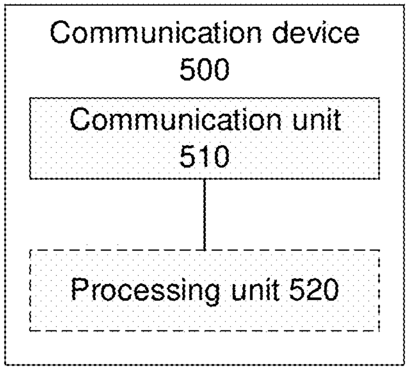
FIG. 14 is a schematic block diagram of another communication device, provided according to the embodiments of the present application.

FIG. 14 shows a schematic block diagram of a communication device 500, according to the embodiments of the present application. As shown in FIG. 14, the communication device 500 is a second communication device, and the communication device 500 includes:

a communication unit 510, configured to transmit a first scheduling signal, where the first scheduling signal is used to schedule or trigger the back scattering communication;

the communication unit 510 is further configured to receive a back scattering signal transmitted by a first communication device; where the back scattering signal is transmitted by the first communication device based on time domain resource information for the back scattering communication, the time domain resource information for the back scattering communication is determined by the first communication device based on first information, the first information is identification information of the first communication device, or the first information is identification information of the first communication device and identification information of a serving cell.

In some embodiments, the communication device 500 further includes: a processing unit 520;

the processing unit 520 is configured to the identification information of the first communication device according to a time unit for transmitting the first scheduling signal and a time unit for receiving the back scattering signal;

the processing unit 520 is configured to descramble the back scattering signal according to the identification information of the first communication device.

In some embodiments, the time domain resource information for the back scattering communication includes at least one of: a starting location of a time domain resource for the back scattering communication, or a back scattering occasion for the back scattering communication.

In some embodiments, the time domain resource information for the back scattering communication includes a starting location of a time domain resource for the back scattering communication;

where the starting location of the time domain resource for the back scattering communication is determined by the first communication device based on a first duration and a first time domain location, and the first duration is determined by the first communication device based on the first information.

In some embodiments, the starting location of the time domain resource for the back scattering communication is determined by the first communication device according to the following formula:

$$T_{start} = T_0 + T;$$

where $T_{start}$ denotes the starting location of the time domain resource for the back scattering communication, $T_0$ denotes the first time domain location, and T denotes the first duration.

In some embodiments, the first time domain location is determined based on the first scheduling signal.

In some embodiments, the first time domain location is a moment at which the first communication device receives the first scheduling signal, or the first time domain location is a starting time domain location at which the first communication device receives the first scheduling signal, or the first time domain location is an ending time domain location at which the first communication device receives the first scheduling signal, or the first time domain location is a time unit in which the first scheduling signal is located, or the first time domain location is a time unit in which a starting time domain location of the first scheduling signal is located, or the first time domain location is a time unit in which an ending time domain location of the first scheduling signal is located, or the first time domain location is indicated by the first scheduling signal.

In some embodiments, the first time domain location is pre-configured, or the first time domain location is agreed by a protocol, or the first time domain location is indicated by the second communication device by a signal other than the first scheduling signal.

In some embodiments, the first duration is determined by the first communication device from N durations according to the following formula:

$$(UE_{ID} \bmod N) + 1, \text{ or } (UE_{ID} \vee \mathrm{Cell}_{ID}) \bmod N + 1,$$

$$\text{or } (UE_{ID} \wedge \mathrm{Cell}_{ID}) \bmod N + 1;$$

where $UE_{ID}$ denotes an identification of the first communication device, $\mathrm{Cell}_{ID}$ denotes a serving cell identification, $\vee$ denotes an OR operation, $\wedge$ denotes an AND operation, and mod denotes a modulo operation.

In some embodiments, the first duration is determined by the first communication device from N durations according to the following formula, where N is a positive integer:

$$(UE_{ID} \vee \text{Cell}_{ID})\text{mod}T_{max}, \text{ or, } UE_{ID}\text{mod}T_{max};$$

where $UE_{ID}$ denotes an identification of the first communication device, $Cell_{ID}$ denotes a serving cell identification, $\vee$ denotes an OR operation, $T_{max}$ denotes a maximum value of the first duration, and mod denotes a modulo operation.

In some embodiments, the $T_{max}$ is pre-configured, or the $T_{max}$ is configured by the second communication device, or the $T_{max}$ is semi-statically configured, or the $T_{max}$ is configured by the second communication device by the first scheduling signal.

In some embodiments, the N durations are pre-configured, or the N durations are configured by the second communication device, or the N durations are semi-statically configured, or the N durations are configured by the second communication device by the first scheduling signal.

In some embodiments, the time domain resource information for the back scattering communication includes a back scattering occasion for the back scattering communication;

where the back scattering occasion for the back scattering communication is determined by the first communication device from at least one available back scattering occasion based on the first information.

In some embodiments, the at least one available back scattering occasion is determined based on a time domain resource structure.

In some embodiments, the at least one available back scattering occasion is a part or all of time units in the time domain resource structure that are available for back scattering.

In some embodiments, the time domain resource structure is indicated by the second communication device by the first scheduling signal, or the time domain resource structure is indicated by the second communication device by a signal other than the first scheduling signal, or the time domain resource structure is semi-statically configured by the second communication device, the time domain resource structure is agreed by a protocol.

In some embodiments, the at least one available back scattering occasion is a part or all of back scattering occasions in a first time domain resource set.

In some embodiments, the first time domain resource set is indicated by the second communication device by the first scheduling signal, or the first time domain resource set is indicated by the second communication device by a signal other than the first scheduling signal, or the first time domain resource set is semi-statically configured by the second communication device.

In some embodiments, the at least one available back scattering occasion is determined by the first communication device based on a length of the first time domain resource set and a back scattering occasion location in the first time domain resource set.

In some embodiments, the at least one available back scattering occasion is a part or all of back scattering occasions in a first back scattering occasion pattern;

where the first back scattering occasion pattern indicates a time domain location of a back scattering occasion that is available for the back scattering communication, in a first time domain resource set.

In some embodiments, the first back scattering occasion pattern is indicated by the second communication device by the first scheduling signal, or the first back scattering occasion pattern is indicated by the second communication device by a signal other than the first scheduling signal, or the first back scattering occasion pattern is semi-statically configured by the second communication device.

In some embodiments, the first back scattering occasion pattern is determined by the first communication device from a plurality of back scattering occasion patterns based on the identification information of the first communication device, or the first back scattering occasion pattern is determined by the first communication device from a plurality of back scattering occasion patterns based on the identification information of the first communication device and the identification information of the serving cell, or the first back scattering occasion pattern is determined by the first communication device from a plurality of back scattering occasion patterns based on identification information of a terminal group to which the first communication device belongs, or the first back scattering occasion pattern is determined by the first communication device from a plurality of back scattering occasion patterns based on identification information of a terminal group to which the first communication device belongs and the identification information of the serving cell.

In some embodiments, the first back scattering occasion pattern is determined by the first communication device from the plurality of back scattering occasion patterns based on the following formula:

$$(UE_{ID}\text{mod}N) + 1, \text{ or } (UE_{ID} \vee \text{Cell}_{ID})\text{mod}N + 1, \text{ or } (UE_{ID} \wedge \text{Cell}_{ID})\text{mod}N + 1;$$

where N is a number of the plurality of back scattering occasion patterns, $UE_{ID}$ denotes an identification of the first communication device, $Cell_{ID}$ denotes a serving cell identification, $\vee$ denotes an OR operation, $\wedge$ denotes an AND operation, and mod denotes a modulo operation.

In some embodiments, the first back scattering occasion pattern is determined by the first communication device from the plurality of back scattering occasion patterns based on the following formula:

$$(UE_{groupID}\text{mod}N) + 1, \text{ or } (UE_{groupID} \vee \text{Cell}_{ID})\text{mod}N + 1, \text{ or } (UE_{groupID} \wedge \text{Cell}_{ID})\text{mod}N + 1;$$

where N is a number of the plurality of back scattering occasion patterns, $UE_{groupID}$ denotes an identification of the terminal group to which the first communication device belongs, $Cell_{ID}$ denotes a serving cell identification, $\vee$ denotes an OR operation, $\wedge$ denotes an AND operation, and mod denotes a modulo operation.

In some embodiments, the plurality of back scattering occasion patterns are indicated by the second communication device by the first scheduling signal, or the plurality of back scattering occasion patterns are indicated by the second communication device by a signal other than the first scheduling signal, or the plurality of back scattering occasion patterns are pre-configured, or the plurality of back scattering occasion patterns are agreed by a protocol, or the plurality of back scattering occasion patterns are semi-statically configured by the second communication device.

In some embodiments, in a time domain, the plurality of back scattering occasion patterns do not overlap with each other, or the plurality of back scattering occasion patterns partially overlap with each other.

In some embodiments, the back scattering signal is obtained by scrambling the identification information of the first communication device.

In some embodiments, the first scheduling signal is an energy supply signal of the first communication device.

In some embodiments, the communication unit 510 is further configured to transmit an energy supply signal of the first communication device, to the first communication device.

In some embodiments, the above communication unit may be a communication interface or a transceiver, or an input and output interface of a communication chip or a system-on-chip. The above processing unit may be one or more processors.

It should be understood that the communication device 500 according to the embodiments of the present application may correspond to the second communication device in the method embodiments of the present application, and the above and other operations and/or functions of various units in the communication device 500 are respectively to implement the corresponding procedure of the second communication device in the method 300 shown in FIG. 12, which will not be repeated here for the sake of brevity.

Figure 15:
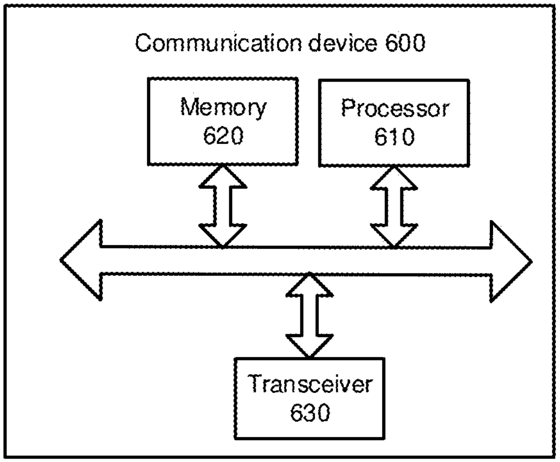
FIG. 15 is a schematic block diagram of yet another communication device, provided according to the embodiments of the present application.

FIG. 15 is a schematic structural diagram of a communication device 600, provided by the embodiments of the present application. The communication device 600 shown in FIG. 15 includes a processor 610, and the processor 610 may invoke and execute a computer program from a memory to implement the method in the embodiments of the present application.

In some embodiments, as shown in FIG. 15, the communication device 600 further includes a memory 620. Herein, the processor 610 may invoke and execute a computer program from the memory 620 to implement the method in the embodiments of the present application.

Herein, the memory 620 may be a separate device independent from the processor 610, or may also be integrated into the processor 610.

In some embodiments, as shown in FIG. 15, the communication device 600 may also include a transceiver 630, and the processor 610 may control the transceiver 630 to communicate with other devices, and for example, to transmit information or data to other devices, or receive information or data transmitted by other devices.

Herein, the transceiver 630 may include a transmitter and a receiver. The transceiver 630 may further include antennas, and the number of antennas may be one or more.

In some embodiments, the communication device 600 may be the network device of the embodiments of the present application, and the communication device 600 may implement the corresponding procedure implemented by the network device in the various methods of the embodiments of the present application, which will not be repeated here for the sake of brevity.

In some embodiments, the communication device 600 may be the terminal device of the embodiments of the present application, and the communication device 600 may implement the corresponding procedure implemented by the terminal device in the various methods of the embodiments of the present application, which will not be repeated here for the sake of brevity.

Figure 16:
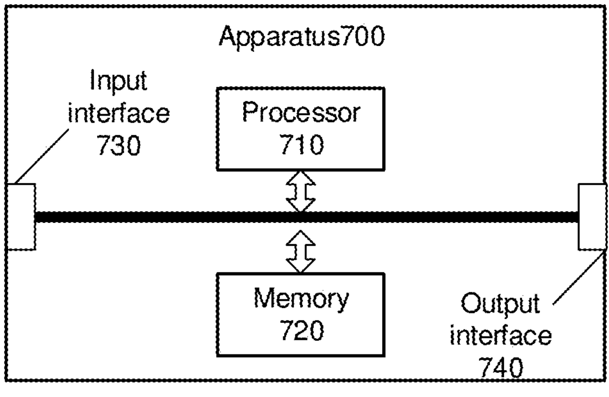
FIG. 16 is a schematic block diagram of an apparatus, provided according to the embodiments of the present application.

FIG. 16 is a schematic structural diagram of an apparatus of the embodiments of the present application. The apparatus 700 shown in FIG. 16 includes a processor 710, the processor 710 may invoke and execute a computer program from a memory to implement the method in the embodiments of the present application.

In some embodiments, as shown in FIG. 16, the apparatus 700 may further include a memory 720. Herein, the processor 710 may invoke and execute a computer program from the memory 720 to implement the method in the embodiments of the present application.

Herein, the memory 720 may be a separate device independent from the processor 710, or may also be integrated into the processor 710.

In some embodiments, the apparatus 700 may further include an input interface 730. Herein, the processor 710 may control the input interface 730 to communicate with other devices or chips, and for example, the input interface 730 may acquire information or data sent by other devices or chips.

In some embodiments, the apparatus 700 may further include an output interface 740. Herein, the processor 710 may control the output interface 740 to communicate with other devices or chips, and for example, the output interface 740 may output information or data to other devices or chips.

In some embodiments, the apparatus may be applied to the network device in the embodiments of the present application, and the apparatus may implement the corresponding procedure implemented by the network device in the various methods of the embodiments of the present application, which will not be repeated here for the sake of brevity.

In some embodiments, the apparatus may be applied to the terminal device in the embodiments of the present application, and the apparatus may implement the corresponding procedure implemented by the terminal device in the various methods of the embodiments of the present application, which will not be repeated here for the sake of brevity.

In some embodiments, the apparatus mentioned in the embodiments of the present application may also be a chip. For example, it may be a system on chip, a system chip, a chip system or a system-on-chip chip, etc.

Figure 17:
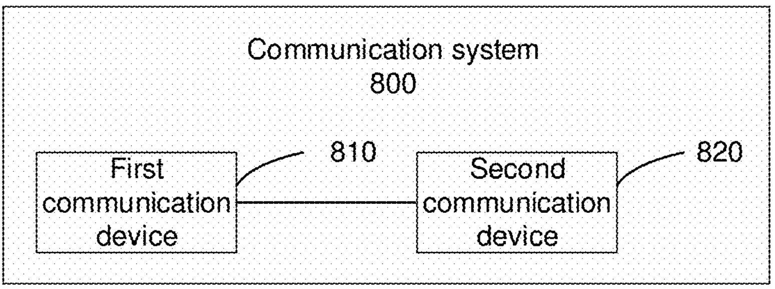
FIG. 17 is a schematic block diagram of a communication system, provided according to the embodiments of the present application.

FIG. 17 is a schematic block diagram of a communication system 800, provided by the embodiments of the present application. As shown in FIG. 17, the communication system 800 includes a first communication device 810 and a second communication device 820.

Herein, the first communication device 810 may be configured to implement the corresponding functions implemented by the first communication device in the above methods, and the second communication device 820 may be configured to implement the corresponding functions implemented by the second communication device in the above methods, which will not be repeated here for the sake of brevity.

It should be understood that the processor in the embodiments of the present application may be an integrated circuit chip and have a processing capability of signals. In the implementation process, various steps of the above method embodiments may be completed by an integrated logic circuit of hardware in the processor or an instruction in a software form. The above processor may be a general-purpose processor, a Digital Signal Processor (DSP), an Application Specific Integrated Circuit (ASIC), a Field Programmable Gate Array (FPGA) or other programmable logic devices, a discrete gate or transistor logic device, a discrete hardware component. Various methods, steps and logical block diagrams disclosed in the embodiments of the present application may be implemented or performed. A general-purpose processor may be a microprocessor, or the processor may also be any conventional processor, etc. The steps of the method disclosed in combination with the embodiments of the present application may be directly embodied as being performed and completed by a hardware decoding processor, or by using a combination of hardware and software modules in the decoding processor. The software module may be located in the mature storage medium in the art such as the random memory, the flash memory, the read-only memory, the programmable read-only memory or electrically erasable programmable memory, the register. The storage medium is located in the memory, and the processor reads the information in the memory and completes the steps of the above methods in combination with its hardware.

It may be understood that, the memory in the embodiments of the present application may be a volatile memory or a non-volatile memory, or may include both volatile and non-volatile memories. Herein, the non-volatile memory may be a Read-Only Memory (ROM), a programmable read-only memory (Programmable ROM, PROM), an erasable programmable read-only memory (Erasable PROM, EPROM), an electrically erasable programmable read-only memory (Electrically EPROM, EEPROM) or a flash memory. The volatile memory may be a Random Access Memory (RAM), which is used as an external cache. Through illustrative, rather than limiting, illustration, many forms of RAMs are available, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchronous link dynamic random access memory (Synchlink DRAM, SLDRAM) and a direct rambus random access memory (Direct Rambus RAM, DR RAM). It should be noted that the memory of the system and the method described herein is intended to include, but not limited to, these and any other suitable types of memories.

It should be understood that the above memory is exemplary but not limiting illustration, e.g., the memory in embodiments of the present application may also be a static Random Access Memory (static RAM, SRAM), a Dynamic Random Access Memory (dynamic RAM, DRAM), a synchronous DRAM (SDRAM), a double data rate SDRAM (DDR SDRAM), an enhanced SDRAM (ESDRAM), a synch link DRAM (SLDRAM), and a Direct Rambus RAM (DR RAM), etc. That is, the memory in the embodiments of the present application is intended to include, but not limited to, these and any other suitable types of memories.

The embodiments of the present application further provide a non-transitory computer readable storage medium for storing a computer program.

In some embodiments, the non-transitory computer readable storage medium may be applied to the communication device in the embodiments of the present application, and the computer program causes a computer to perform the corresponding procedure implemented by the first communication device in the various methods of the embodiments of the present application, which will not be repeated here for the sake of brevity.

In some embodiments, the non-transitory computer readable storage medium may be applied to the communication device in the embodiments of the present application, and the computer program causes a computer to perform the corresponding procedure implemented by the second communication device in various methods of the embodiments of the present application, which will not be repeated here for the sake of brevity.

The embodiments of the present application further provide a computer program product including a computer program instruction.

In some embodiments, the computer program product may be applied to the communication device in the embodiments of the present application, and the computer program instruction causes a computer to perform the corresponding procedure implemented by the first communication device in the various methods of the embodiments of the present application, which will not be repeated here for the sake of brevity.

In some embodiments, the computer program product may be applied to the communication device in the embodiments of the present application, and the computer program instruction causes a computer to perform the corresponding procedure implemented by the second communication device in various methods of the embodiments of the present application, which will not be repeated here for the sake of brevity.

The embodiments of the present application further provide a computer program.

In some embodiments, the computer program may be applied to the communication device in the embodiments of the present application, the computer program when being executed on a computer, causes the computer to perform the corresponding procedure implemented by the first communication device in various methods of the embodiments of the present application, which will not be repeated here for the sake of brevity.

In some embodiments, the computer program may be applied to the communication device in the embodiments of the present application, the computer program when being executed on a computer, causes the computer to perform the corresponding procedure implemented by the second communication device in various methods of the embodiments of the present application, which will not be repeated here for the sake of brevity.

Those ordinary skilled in the art may realize that units and algorithm steps of the examples described in combination with the embodiments disclosed herein can be implemented in electronic hardware or in a combination of computer software and electronic hardware. Whether these functions are performed by way of hardware or software depends on an application and a design constraint of the technical solution. A skilled person may use different methods for each application, to implement the described functions, but such implementation should not be considered beyond the scope of the present application.

It may be clearly understood by those skilled in the art that, for convenience and brevity of the description, the working procedures of the system, the apparatus and the unit described above may refer to the corresponding procedures in the above method embodiments, which will not be repeated here.

In the several embodiments provided by the application, it should be understood that, the disclosed systems, apparatus, and method may be implemented in other ways. For example, the apparatus embodiments described above are only schematic, for example, division of the units is only division of logical functions, and there may be other division methods in an actual implementation, for example, a plurality of units or components may be combined or integrated into another system, or some features may be ignored or not performed. On the other hand, the coupling or direct coupling or communicative connection between each other as shown or discussed may be indirect coupling or communicative connection of apparatus or units via some interfaces, which may be electrical, mechanical, or in other forms.

The units illustrated as separate components may be or may not be physically separated, and the components shown as units may be or may not be physical units, that is, they may be located in one place, or may be distributed onto a plurality of network units. A part or all of the units may be selected according to actual needs, to implement the purpose of the schemes of the embodiments.

In addition, the various functional units in the various embodiments of the present application may be integrated into one processing unit, or the various units may exist physically separately, or two or more units may be integrated into one unit.

If the described functions are implemented in the form of a software functional unit and sold or used as an independent product, they may be stored in a non-transitory computer readable storage medium. For this understanding, the technical solution of the present application essentially, or a part of the technical solution that contributes to the prior art, or a part of the technical solution, may be embodied in the form of a software product, and the computer software product is stored in a storage medium, and includes a plurality of instructions for enabling a computer device (which may be a personal computer, a server, or a network device, etc.) to perform all or some of steps of the methods described in the various embodiments of the present application. And, the storage medium mentioned above includes a USB flash drive (U disk), a mobile hard disk, a Read-Only Memory (ROM), a Random Access Memory (RAM), a diskette, or an optical disk, and various mediums that may store program codes.

The above content is only exemplary implementations of the present application, but the protection scope of the present application is not limited thereto, and any skilled familiar with this technical field may easily think of changes or substitutions within the technical scope disclosed in the present application, which should be all covered within the protection scope of the present application. Therefore, the protection scope of the present application should be subject to the protection scope of the claims.

What is claimed is:

1. A method of back scattering communication, comprising:

determining by a first communication device, time domain resource information for the back scattering communication according to first information;

wherein the first information is identification information of the first communication device, or the first information is identification information of the first communication device and identification information of a serving cell;

wherein the time domain resource information for the back scattering communication comprises a back scattering occasion for the back scattering communication; and determining by the first communication device, the time domain resource information for the back scattering communication according to the first information, comprises:

determining by the first communication device, the back scattering occasion for the back scattering communication from at least one available back scattering occasion according to the first information.

2. The method according to claim 1, wherein the time domain resource information for the back scattering communication further comprises a starting location of a time domain resource for the back scattering communication;

determining by the first communication device, the time domain resource information for the back scattering communication according to the first information, comprises:

determining by the first communication device, a first duration according to the first information; and determining by the first communication device, the starting location of the time domain resource for the back scattering communication according to the first duration and a first time domain location;

wherein determining by the first communication device, the starting location of the time domain resource for the back scattering communication according to the first duration and the first time domain location, comprises:

determining by the first communication device, the starting location of the time domain resource for the back scattering communication according to the following formula:

$$T_{start} = T_0 + T;$$

wherein $T_{start}$ denotes the starting location of the time domain resource for the back scattering communication, $T_0$ denotes the first time domain location, and T denotes the first duration.

3. The method according to claim 2, wherein the first time domain location is determined based on a first scheduling signal for scheduling or triggering the back scattering communication; wherein the first time domain location is a moment at which the first communication device receives the first scheduling signal, or the first time domain location is a starting time domain location at which the first communication device receives the first scheduling signal, or the first time domain location is an ending time domain location at which the first communication device receives the first scheduling signal, or the first time domain location is a time unit in which the first scheduling signal is located, or the first time domain location is a time unit in which a starting time domain location of the first scheduling signal is located, or the first time domain location is a time unit in which an ending time domain location of the first scheduling signal is located, or the first time domain location is indicated by the first scheduling signal.

4. The method according to claim 1, wherein the at least one available back scattering occasion is determined based on a time domain resource structure;

wherein the at least one available back scattering occasion is a part or all of time units in the time domain resource structure that are available for back scattering.

5. The method according to claim 4, wherein the time domain resource structure is indicated by a second communication device by a first scheduling signal for scheduling or triggering the back scattering communication, or the time domain resource structure is indicated by a second communication device by a signal other than a first scheduling signal for scheduling or triggering the back scattering communication, or the time domain resource structure is semi-statically configured by a second communication device, or the time domain resource structure is agreed by a protocol.

6. The method according to claim 1, wherein the at least one available back scattering occasion is a part or all of back scattering occasions in a first time domain resource set;

wherein the first time domain resource set is indicated by a second communication device by a first scheduling signal for scheduling or triggering the back scattering communication, or the first time domain resource set is indicated by a second communication device by a signal other than a first scheduling signal for scheduling or triggering the back scattering communication, or the first time domain resource set is semi-statically configured by a second communication device.

7. The method according to claim 6, further comprising:

determining by the first communication device, the at least one available back scattering occasion according to a length of the first time domain resource set and a back scattering occasion location in the first time domain resource set.

8. The method according to claim 1, wherein the at least one available back scattering occasion is a part or all of back scattering occasions in a first back scattering occasion pattern;

wherein the first back scattering occasion pattern indicates a time domain location of a back scattering occasion that is available for the back scattering communication, in a first time domain resource set;

wherein the first back scattering occasion pattern is indicated by a second communication device by a first scheduling signal for scheduling or triggering the back scattering communication, or the first back scattering occasion pattern is semi-statically configured by a second communication device.

9. The method according to claim 1, further comprising:

transmitting by the first communication device, a back scattering signal according to a determined time domain resource for the back scattering communication.

10. The method according to claim 1, wherein the first communication device obtains energy by energy harvesting, to be used for communication, information collecting and processing;

and the method further comprises:

in a case where a first scheduling signal for scheduling or triggering the back scattering communication is an energy supply signal of the first communication device, monitoring by the first communication device, the first scheduling signal during the energy harvesting;

or in a case where an energy supply signal of the first communication device does not comprise scheduling information, monitoring by the first communication device, a first scheduling signal for scheduling or triggering the back scattering communication, after the energy harvesting.

11. A method of back scattering communication, comprising:

transmitting by a second communication device, a first scheduling signal, wherein the first scheduling signal is used to schedule or trigger the back scattering communication;

receiving by the second communication device, a back scattering signal transmitted by a first communication device; wherein the back scattering signal is transmitted by the first communication device based on time domain resource information for the back scattering communication, the time domain resource information for the back scattering communication is determined by the first communication device from at least one available back scattering occasion based on first information, the first information is identification information of the first communication device, or the first information is identification information of the first communication device and identification information of a serving cell;

wherein the time domain resource information for the back scattering communication comprises a back scattering occasion for the back scattering communication.

12. The method according to claim 11, wherein the time domain resource information for the back scattering communication further comprises a starting location of a time domain resource for the back scattering communication;

wherein the starting location of the time domain resource for the back scattering communication is determined by the first communication device based on a first duration and a first time domain location, and the first duration is determined by the first communication device based on the first information; wherein the starting location of the time domain resource for the back scattering communication is determined by the first communication device according to the following formula:

$$T_{start} = T_0 + T;$$

wherein $T_{start}$ denotes the starting location of the time domain resource for the back scattering communication, $T_0$ denotes the first time domain location, and T denotes the first duration.

13. The method according to claim 12, wherein the first time domain location is determined based on the first scheduling signal; wherein the first time domain location is a moment at which the first communication device receives the first scheduling signal, or the first time domain location is a starting time domain location at which the first communication device receives the first scheduling signal, or the first time domain location is an ending time domain location at which the first communication device receives the first scheduling signal, or the first time domain location is a time unit in which the first scheduling signal is located, or the first time domain location is a time unit in which a starting time domain location of the first scheduling signal is located, or the first time domain location is a time unit in which an ending time domain location of the first scheduling signal is located, or the first time domain location is indicated by the first scheduling signal.

14. The method according to claim 11, wherein the at least one available back scattering occasion is determined based on a time domain resource structure;

wherein the at least one available back scattering occasion is a part or all of time units in the time domain resource structure that are available for back scattering.

15. A first communication device, comprising: a processor and a memory, wherein the memory is configured to store a computer program, the processor is configured to invoke and execute the computer program stored in the memory, to cause the first communication device to:

determine time domain resource information for the back scattering communication according to first information;

wherein the first information is identification information of the first communication device, or the first information is identification information of the first communication device and identification information of a serving cell;

wherein the time domain resource information for the back scattering communication comprises a back scattering occasion for the back scattering communication; and the first communication device is configured to determine the back scattering occasion for the back scattering communication from at least one available back scattering occasion according to the first information.

16. The first communication device according to claim 15, wherein the time domain resource information for the back scattering communication further comprises a starting location of a time domain resource for the back scattering communication;

the first communication device is configured to determine a first duration according to the first information; and determine the starting location of the time domain resource for the back scattering communication according to the first duration and a first time domain location;

wherein to determine the starting location of the time domain resource for the back scattering communication according to the first duration and the first time domain location, the first communication device is configured to determine the starting location of the time domain resource for the back scattering communication according to the following formula:

$$T_{start} = T_0 + T;$$

wherein $T_{start}$ denotes the starting location of the time domain resource for the back scattering communication, $T_0$ denotes the first time domain location, and T denotes the first duration.

17. The first communication device according to claim 16, wherein the first time domain location is determined based on a first scheduling signal for scheduling or triggering the back scattering communication; wherein the first time domain location is a moment at which the first communication device receives the first scheduling signal, or the first time domain location is a starting time domain location at which the first communication device receives the first scheduling signal, or the first time domain location is an ending time domain location at which the first communication device receives the first scheduling signal, or the first time domain location is a time unit in which the first scheduling signal is located, or the first time domain location is a time unit in which a starting time domain location of the first scheduling signal is located, or the first time domain location is a time unit in which an ending time domain location of the first scheduling signal is located, or the first time domain location is indicated by the first scheduling signal.

18. The first communication device according to claim 15, wherein the at least one available back scattering occasion is determined based on a time domain resource structure;

wherein the at least one available back scattering occasion is a part or all of time units in the time domain resource structure that are available for back scattering.

19. The first communication device according to claim 15, wherein the at least one available back scattering occasion is a part or all of back scattering occasions in a first time domain resource set;

wherein the first time domain resource set is indicated by a second communication device by a first scheduling signal for scheduling or triggering the back scattering communication, or the first time domain resource set is indicated by a second communication device by a signal other than a first scheduling signal for scheduling or triggering the back scattering communication, or the first time domain resource set is semi-statically configured by a second communication device.

20. The first communication device according to claim 15, wherein the at least one available back scattering occasion is a part or all of back scattering occasions in a first back scattering occasion pattern;

wherein the first back scattering occasion pattern indicates a time domain location of a back scattering occasion that is available for the back scattering communication, in a first time domain resource set;

wherein the first back scattering occasion pattern is indicated by a second communication device by a first scheduling signal for scheduling or triggering the back scattering communication, or the first back scattering occasion pattern is semi-statically configured by a second communication device.

* * * * *